US011041547B2

(12) United States Patent
Yoo et al.

(10) Patent No.: US 11,041,547 B2
(45) Date of Patent: Jun. 22, 2021

(54) SHIFTING MANIPULATION-ASSISTING DEVICE AND HUB-EMBEDDED TRANSMISSION HAVING THE SAME

(71) Applicant: MBI CO., LTD., Cheongju-si (KR)

(72) Inventors: Hyuk Yoo, Cheongju-si (KR); Tae-Jin Jung, Cheongju-si (KR); Seong-Cheol An, Cheongju-si (KR); Moon-Soo Yoo, Seongnam-si (KR)

(73) Assignee: MBI CO., LTD., Cheongju-si (KR)

( * ) Notice: Subject to any disclaimer, the term of this patent is extended or adjusted under 35 U.S.C. 154(b) by 0 days.

(21) Appl. No.: 16/759,120

(22) PCT Filed: Aug. 31, 2018

(86) PCT No.: PCT/KR2018/010104

§ 371 (c)(1),
(2) Date: Aug. 3, 2020

(87) PCT Pub. No.: WO2019/103288

PCT Pub. Date: May 31, 2019

(65) Prior Publication Data

US 2020/0355245 A1 Nov. 12, 2020

(30) Foreign Application Priority Data

Nov. 23, 2017 (KR) ........................ 10-2017-0157441

(51) Int. Cl.
*F16H 3/66* (2006.01)
*F16H 61/36* (2006.01)
*F16H 63/30* (2006.01)

(52) U.S. Cl.
CPC ............... *F16H 3/66* (2013.01); *F16H 61/36* (2013.01); *F16H 2063/3089* (2013.01);
(Continued)

(58) Field of Classification Search
CPC .... F16H 3/66; F16H 61/36; F16H 2063/3089; F16H 2200/2005; F16H 2200/2007;
(Continued)

(56) References Cited

U.S. PATENT DOCUMENTS

2016/0075403 A1* 3/2016 Yoo ........................... F16H 3/54
475/269

FOREIGN PATENT DOCUMENTS

JP 4145808 B2 9/2008
KR 10-0954300 B1 4/2010
(Continued)

OTHER PUBLICATIONS

Written Opinion, dated Dec. 19, 2018, for International Application No. PCT/KR2018/010104.

(Continued)

*Primary Examiner* — Roger L Pang
(74) *Attorney, Agent, or Firm* — LRK Patent Law Firm

(57) ABSTRACT

A shifting manipulation-assisting device and a hub-embedded transmission, wherein in controlling pawls that restrain rotation of sun gears to perform shifting in a planetary gear set, shifting control is properly performed even with a small manipulation force. The shifting manipulation-assisting device includes a pawl control ring having an inner peripheral surface to control laying-down of control pawls, and an outer peripheral surface formed with rotation restricting protrusions; an angle control member positioned on an inner periphery side of a driver; pressing members supported on the angle control member, and positioned between the unidirectionally inclined recesses and an inner peripheral surface of the driver; an elastic connecting body connected to resiliently support the pawl control ring; a fixed support member non-rotatably fixed to the shaft and rotatably sup-
(Continued)

porting the driver; and a return spring connected to reversely rotate and accordingly return the angle control member.

6 Claims, 13 Drawing Sheets

(52) U.S. Cl.
CPC ................ *F16H 2200/2005* (2013.01); *F16H 2200/2007* (2013.01); *F16H 2200/2079* (2013.01); *F16H 2200/2097* (2013.01)

(58) Field of Classification Search
CPC .... F16H 2200/2097; F16H 3/70; F16H 61/04; F16H 63/30; F16H 3/44; F16H 2200/2079; B62M 25/02
USPC .................................................. 475/294, 297
See application file for complete search history.

(56) References Cited

FOREIGN PATENT DOCUMENTS

| | | |
|---|---|---|
| KR | 10-1286204 B1 | 7/2013 |
| KR | 10-1357220 B1 | 1/2014 |
| KR | 10-1422135 B1 | 7/2014 |
| KR | 10-1817629 B1 | 2/2018 |

OTHER PUBLICATIONS

Search Report, dated Dec. 19, 2018, for International Application No. PCT/KR2018/010104.

* cited by examiner 500
560
550
570
580
200
604
210
310
605
412
220
400
201
413
411b
411a
300
301
603
601
100

SHIFTING MANIPULATION-ASSISTING DEVICE AND HUB-EMBEDDED TRANSMISSION HAVING THE SAME

CROSS-REFERENCE TO RELATED APPLICATIONS

The present application is a U.S. National Phase entry from International Application No. PCT/KR2018/010104, filed Aug. 31, 2018, which claims priority to Korean Patent Application No. 10-2017-0157441, filed Nov. 23, 2017, the disclosures of which are incorporated by reference herein in their entirety.

BACKGROUND

1. Technical Field

The present invention relates to a shifting manipulation-assisting device and a hub-embedded transmission having the same, and more particularly, to a shifting manipulation-assisting device and a hub-embedded transmission having the same, wherein in controlling laying-down of pawls that selectively restrain rotation of sun gears so as to perform shifting in a planetary gear set, forced shifting is properly performed depending on a pressured frictional force, thereby improving durability, enhancing user's convenience and driving stability, and maximizing marketability and market competitiveness of the transmission.

2. Description of Related Art

Generally, a transmission is provided to improve driving performance of a transportation apparatus such as a bicycle, a wheelchair, an automobile, a scooter or the like, which is provided with wheels and travels using various kinds of driving forces such as man power or an electromotive force.

Such a transmission performs shifting in multiple stages, including two or more stages, from a low speed to a high speed in response to manipulation of a rider or user to properly obtain a torque or speed required under a driving condition.

In particular, recently, a planetary gear set including sun gears, planetary gears, a ring gear and a carrier is provided in a hub shell to achieve a compact configuration, thereby performing shifting in multiple stages and simultaneously preventing the gears from being exposed to the outside.

However, a conventional transmission using the planetary gear set has a technical problem in that since pawls are strongly restrained to ratchets formed on inner peripheral surfaces of the sun gears due to a driving load in a loaded driving state, the pawls are not released from the sun gears when shifting manipulation is performed, so that smooth shifting is not achieved.

In addition, there was also a problem in the prior art that since consideration was not given to a pressured frictional force generated between a rotary body and a restraint body during forced shifting, a forced shifting function is not properly performed due to a too weak pressured frictional force, or damage to components or a large shifting shock occur due to forced shifting resulting from a too excessive pressured frictional force.

Related Document: (Patent Document 1) Korean Patent No. 10-1422135

SUMMARY

The present invention is conceived to solve the aforementioned problems. An object of the present invention is to provide a shifting manipulation-assisting device, which enables shifting control to be smoothly performed in a transmission having a planetary gear set and simultaneously allows forced shifting to be properly performed depending on a pressured frictional force, thereby preventing damage to components to improve durability, preventing a large shifting shock to enhance user's convenience and driving stability, and maximizing marketability and market competitiveness of the transmission; and a hub-embedded transmission having the shifting manipulation-assisting device.

A shifting manipulation-assisting device according to the present invention includes a pawl control ring having an inner peripheral surface configured to control laying-down of control pawls provided on a shaft depending on a rotation angle, and an outer peripheral surface formed with rotation restricting protrusions and unidirectionally inclined recesses; an angle control member configured to be positioned on an inner periphery side of a driver rotated by receiving a rotational force and supported on the shaft, wherein the angle control member is rotated in response to shifting manipulation and has an outer periphery formed with rotation restricting depressions for accommodating the rotation restricting protrusions with a free-rotation gap in a circumferential direction; pressing members formed in a spherical or cylindrical shape, supported on the angle control member so as to be movable in a radial direction, and positioned between the unidirectionally inclined recesses of the pawl control ring and an inner peripheral surface of the driver; an elastic connecting body connected between the pawl control ring and the angle control member to resiliently support the pawl control ring such that the pawl control ring is rotated with respect to the angle control member; a fixed support member non-rotatably fixed to the shaft and rotatably supporting the driver via a bearing; and a return spring connected between the angle control member and the fixed support member to resiliently and reversely rotate and accordingly return the angle control member that has been rotated in one direction in response to the shifting manipulation. Here, as a phase angle difference is generated in the circumferential direction between the angle control member and the pawl control ring, the pressing members ride on and outwardly move along the unidirectionally inclined recesses and come into pressured frictional contact with the inner peripheral surface of the driver, so that a rotational force of the driver can be selectively transmitted to the pawl control ring depending on magnitude of a pressured frictional force generated between the driver and the pressing members so as to adjust forced laying-down of the control pawls.

Preferably, the smaller an inclination angle of the unidirectionally inclined recesses with respect to the outer peripheral surface of the pawl control ring is or the greater an elastic modulus of the return spring is, the higher the pressured frictional force generated between the driver and the pressing members can be; and the larger the inclination angle of the unidirectionally inclined recesses with respect to the outer peripheral surface of the pawl control ring is or the smaller the elastic modulus of the return spring is, the lower the pressured frictional force generated between the driver and the pressing members can be.

Moreover, it is preferable that the inclination angle of the unidirectionally inclined recesses with respect to the outer peripheral surface of the pawl control ring is 12° to 20°.

Further, a hub-embedded transmission having a shifting manipulation-assisting device according to the present invention includes a shaft fixed to a vehicle body; a driver and a hub shell rotatably positioned on around of the shaft, wherein the driver receives a rotational force and the hub shell outputs the rotational force; a shifting unit including a planetary gear set provided in the hub shell, wherein the planetary gear set includes sun gears, planetary gears and a ring gear, the driver rotatably supports the planetary gears so as to serve as a carrier, the driver is provided with elastic pawls resiliently supported to protrude outwardly, and an inner peripheral surface of the ring gear is further formed with first teeth to be engaged with the planetary gears and second teeth to be engaged with the elastic pawls, whereby the shifting unit shifts a rotational force received from the driver and outputs a shifted rotational force to the hub shell; and a control unit including the aforementioned shifting manipulation-assisting device and configured to control control pawls positioned in pawl seating portions formed on the outer peripheral surface of the shaft while the control unit is rotated in a circumferential direction in response to manipulation of a shift lever, so as to selectively restrain rotation of the sun gears, thereby controlling shifting of the shifting unit.

Preferably, the control unit includes a cable connecting member rotatably supported on the outer peripheral surface of the shaft, wherein a cable to be pulled in response to the manipulation of the shift lever is connected to the cable connecting member; and an intermediate connecting member engaged with an inner peripheral surface of the cable connecting member and rotated integrally with the cable connecting member. Preferably, the angle control member passes through the fixed support member without rotational interference and is assembled to an inner peripheral surface of the intermediate connecting member so as to transmit the rotational force in one direction.

In addition, it is preferable that the planetary gears are comprised with one-stage planetary gears or multi-stage planetary gears having two or more stages, and the control pawls and the sun gears are further configured depending on the number of stages of the planetary gear so as to enable shifting to be performed with the number of shifting stages that is "(the number of stages of the planetary gear)+1".

Advantageous Effect

The present invention enables shifting control to be smoothly performed in a transmission having a planetary gear set and simultaneously allows forced shifting to be properly performed by arbitrarily adjusting a pressured frictional force, thereby preventing damage to components to improve durability, preventing a large shifting shock to enhance user's convenience and driving stability, and maximizing marketability and market competitiveness of the transmission.

Figure 1:
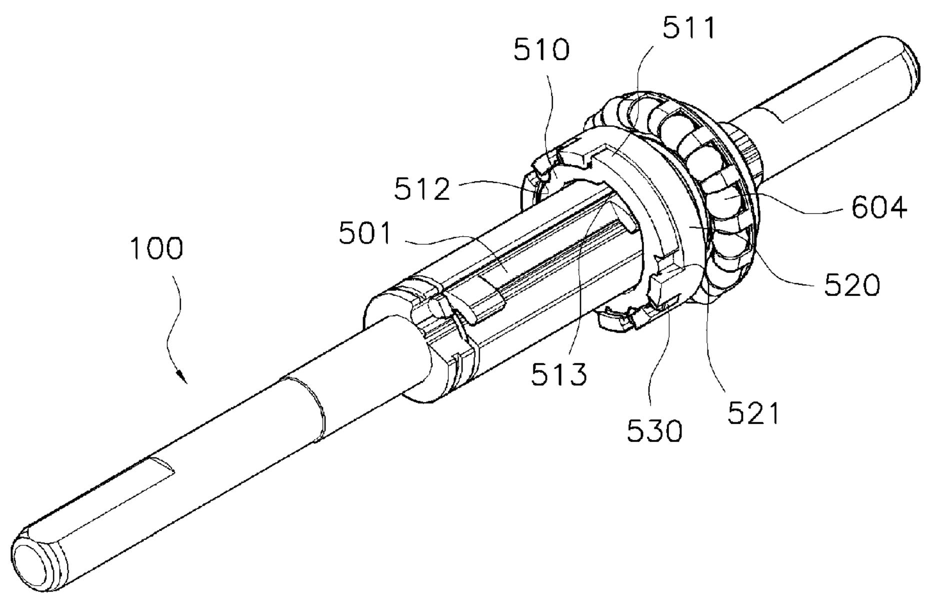
FIG. 1 is a left perspective view showing a shifting manipulation-assisting device according to the present invention.

| Description of Reference Numerals | |
|---|---|
| 100: Shaft | 101: Pawl seating portion |
| 200: Driver | 210: Sprocket |
| 220: Elastic pawl | 221: Supporting shaft |
| 222: Coil spring | 300: Hub shell |
| 301: Hole | 310: Dust cover |
| 400: Shifting unit | 410: Planetary gear set |
| 411a, 411b: Sun gear | 412: Planetary gear |
| 412a: Larger-diameter portion | 412b: Smaller-diameter portion |
| 413: Ring gear | 413a: First tooth |
| 413b: Second tooth | 420: Elastic pawl |
| 500: Control unit | 501: First control pawl |
| 502: Second control pawl | 510: Pawl control ring |
| 511: Rotation restricting protrusion | 512: Unidirectionally inclined recess |
| 513, 514: Groove | 515: Catching groove |
| 520: Angle control member | 521: Rotation restricting depression |
| 522: Assembling hole | 523: Protrusion |
| 530: Pressing member | 540: Elastic connecting body |
| 550: Cable connecting member | 560: Intermediate connecting member |
| 561: Coupling recess | 570: Return spring |
| 601: Cone nut | 603, 604, 605: Bearing |

DETAILED DESCRIPTION OF THE INVENTION

Figure 2:
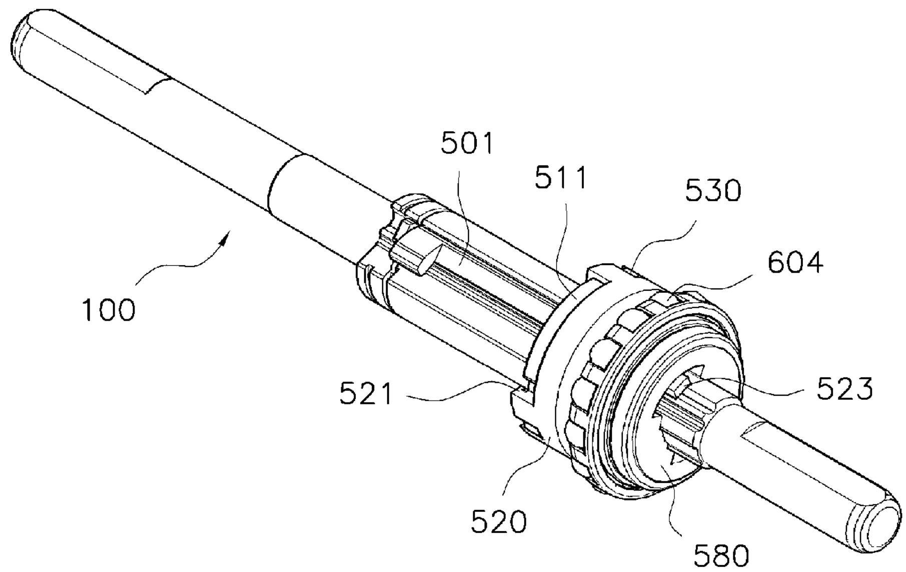
FIG. 2 is a right perspective view showing the shifting manipulation-assisting device according to the present invention.

FIG. 1 is a left perspective view showing a shifting manipulation-assisting device according to the present invention, and FIG. 2 is a right perspective view showing the shifting manipulation-assisting device according to the present invention.

Figure 3:
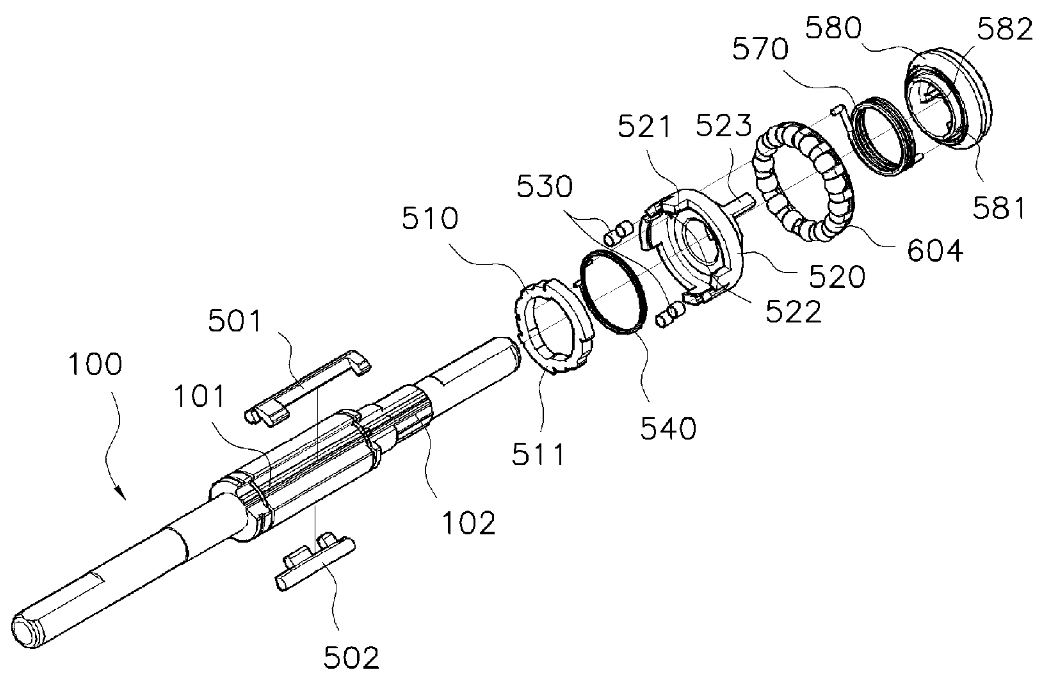
FIG. 3 is a left exploded perspective view showing the shifting manipulation-assisting device according to the present invention.
Figure 4:
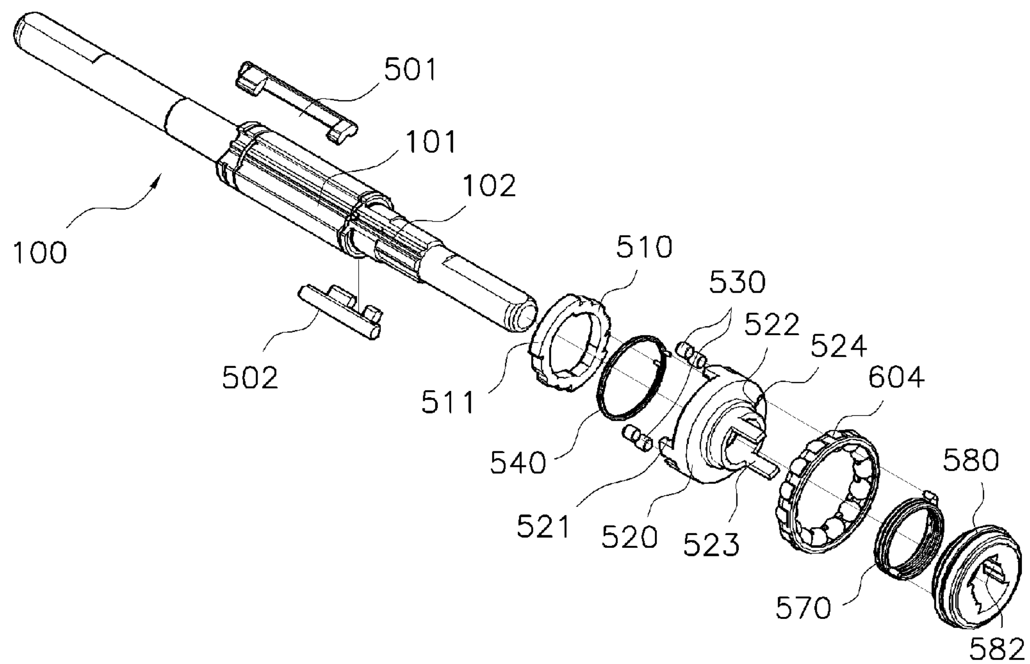
FIG. 4 is a right exploded perspective view showing the shifting manipulation-assisting device according to the present invention.

Further, FIG. 3 is a left exploded perspective view showing the shifting manipulation-assisting device according to the present invention, and FIG. 4 is a right exploded perspective view showing the shifting manipulation-assisting device according to the present invention.

Figure 5:
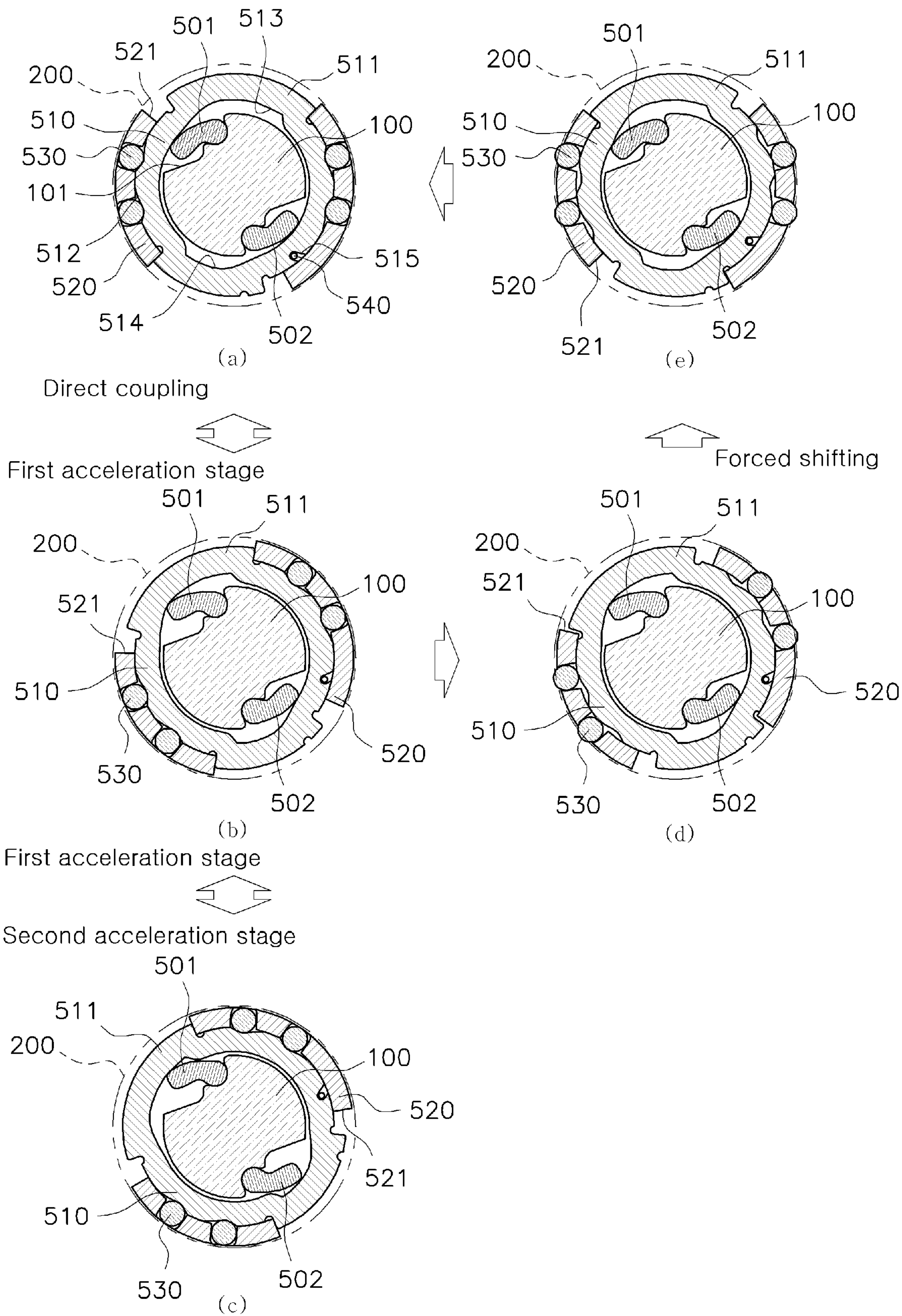
FIG. 5 is a right sectional view showing operations of the shifting manipulation-assisting device according to the present invention.
Figure 6:
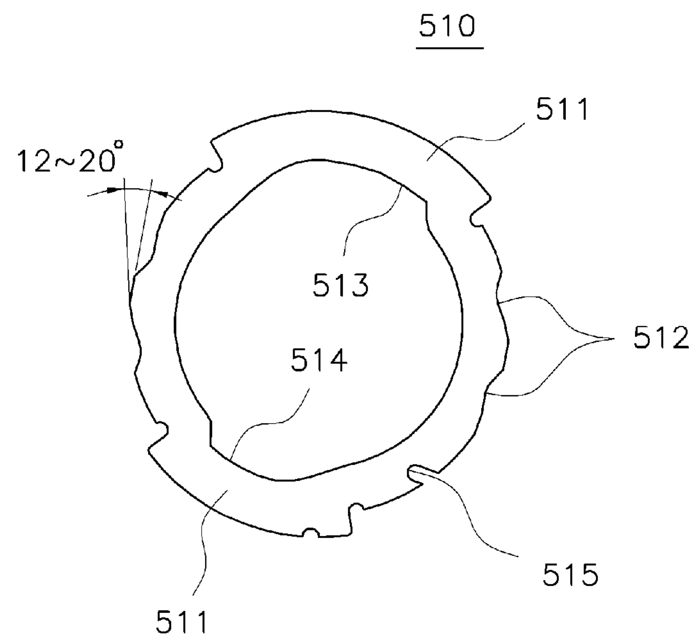
FIG. 6 is a right side view showing a pawl control ring in the shifting manipulation-assisting device according to the present invention.

Moreover, FIG. 5 is a right sectional view showing operations of the shifting manipulation-assisting device according to the present invention, and FIG. 6 is a right side view showing a pawl control ring in the shifting manipulation-assisting device according to the present invention.

Figure 7:
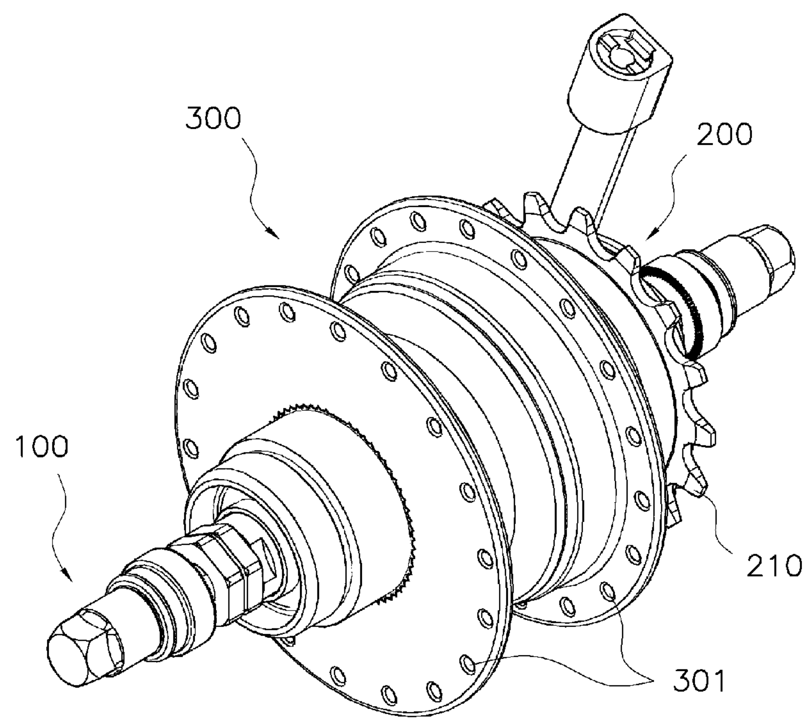
FIG. 7 is a left perspective view showing a hub-embedded transmission having the shifting manipulation-assisting device according to the present invention.
Figure 8:
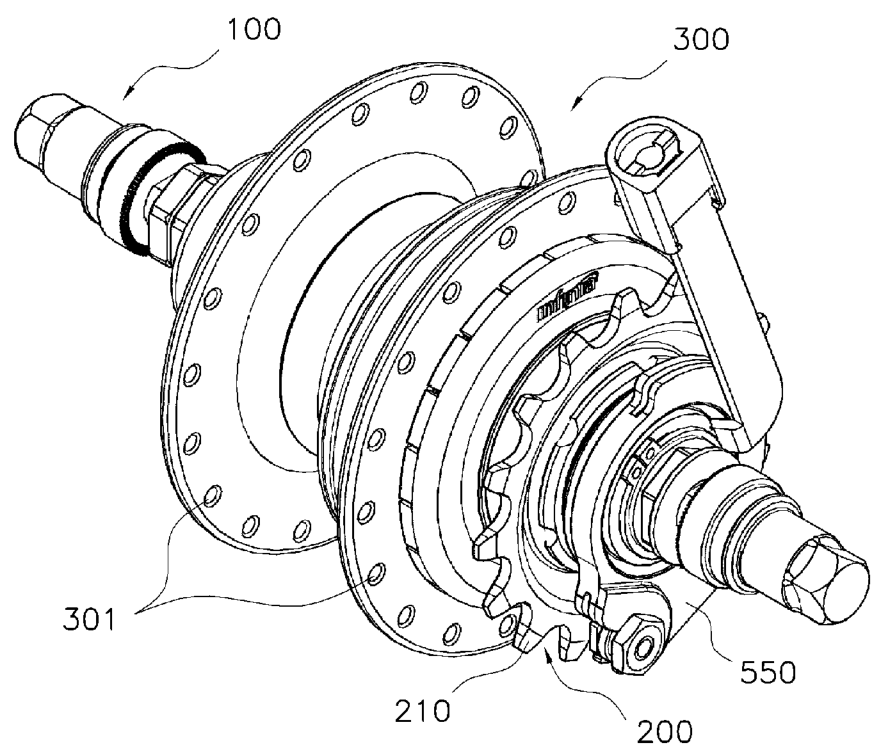
FIG. 8 is a right perspective view showing the hub-embedded transmission having the shifting manipulation-assisting device according to the present invention.

Furthermore, FIG. 7 is a left perspective view showing a hub-embedded transmission having the shifting manipulation-assisting device according to the present invention, and FIG. 8 is a right perspective view showing the hub-embedded transmission having the shifting manipulation-assisting device according to the present invention.

Figure 9:
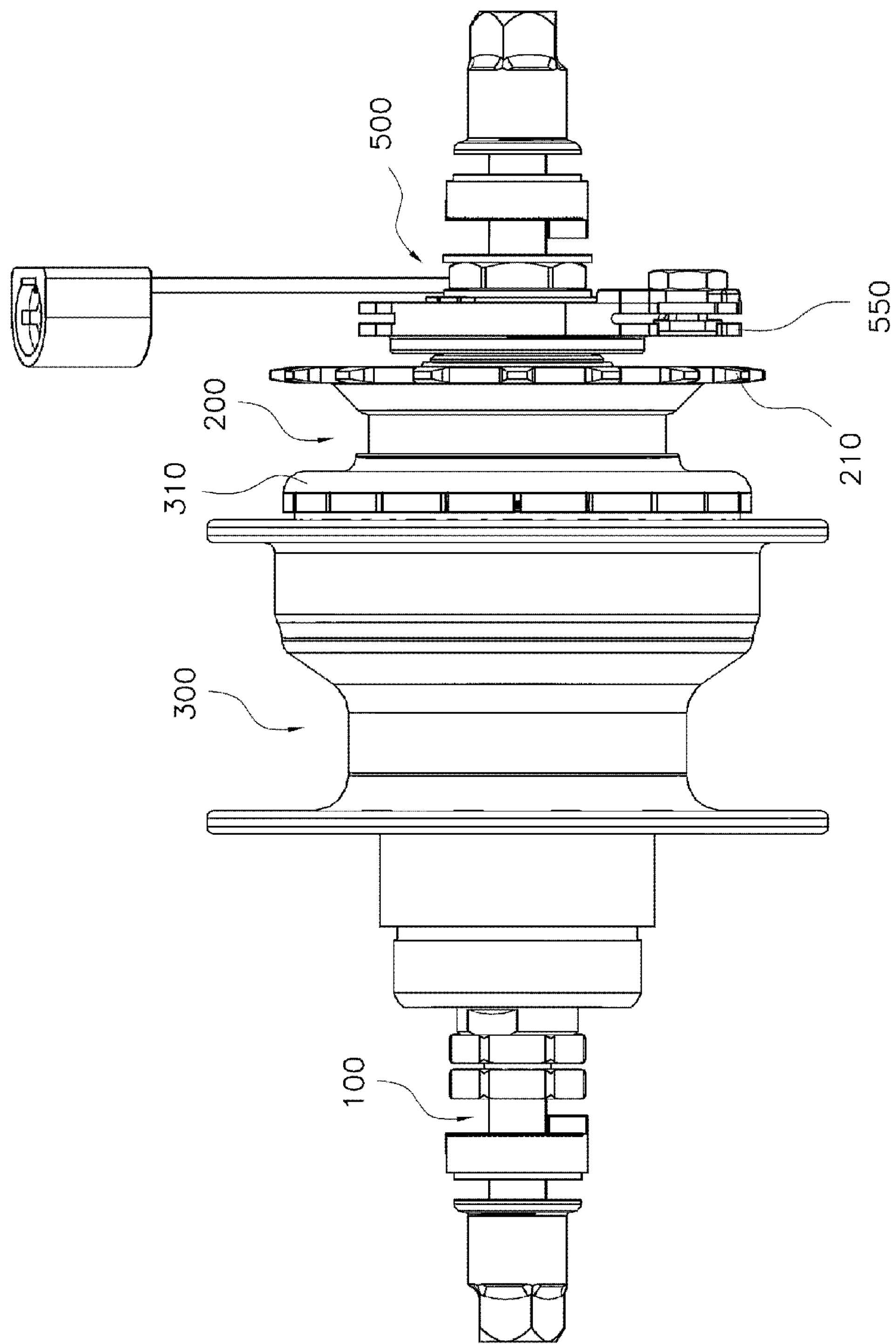
FIG. 9 is a front view showing the hub-embedded transmission having the shifting manipulation-assisting device according to the present invention.
Figure 10:
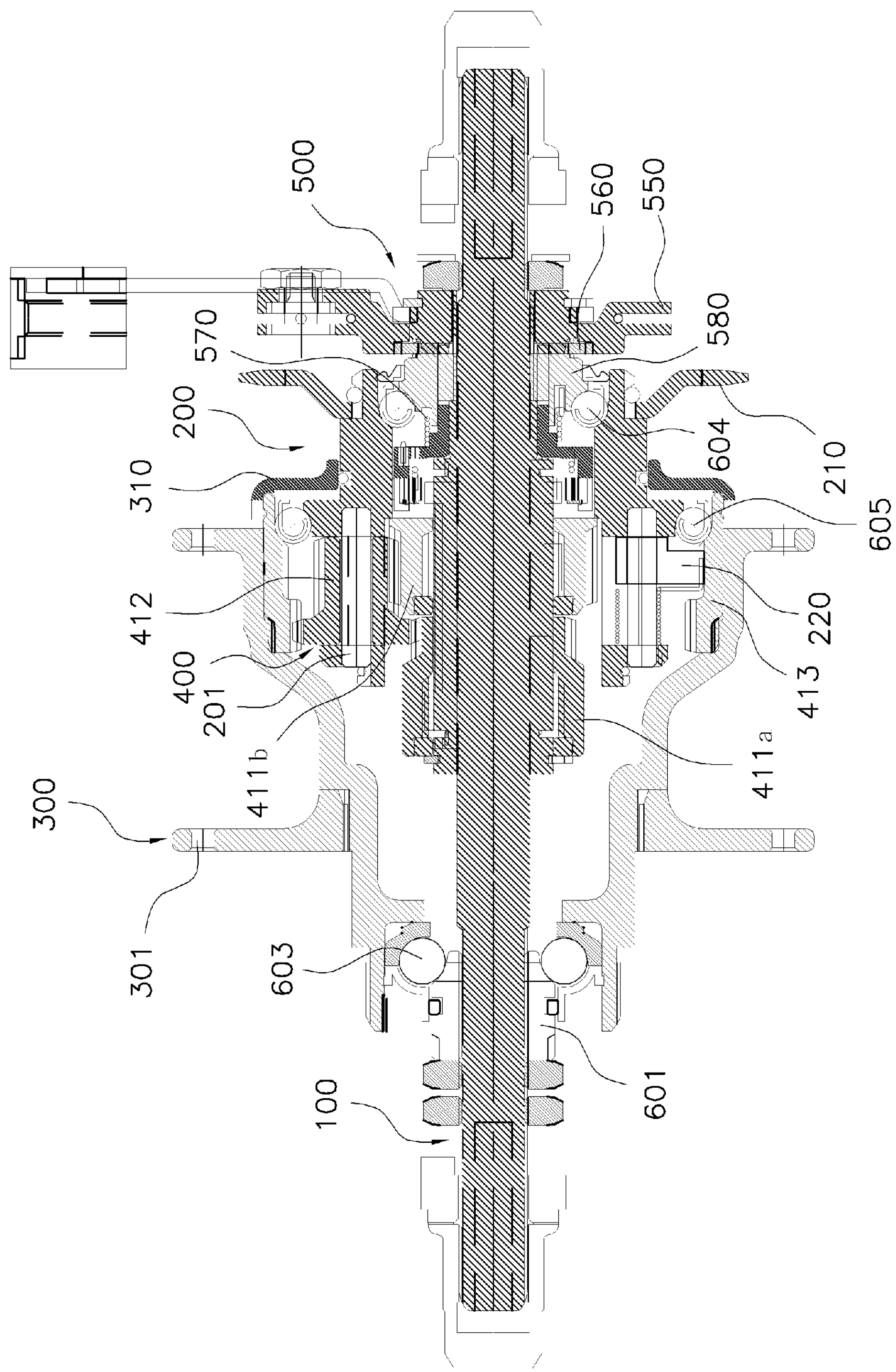
FIG. 10 is a front sectional view showing the hub-embedded transmission having the shifting manipulation-assisting device according to the present invention.

Moreover, FIG. 9 is a front view showing the hub-embedded transmission having the shifting manipulation-assisting device according to the present invention, and FIG. 10 is a front sectional view showing the hub-embedded transmission having the shifting manipulation-assisting device according to the present invention.

Figure 11:
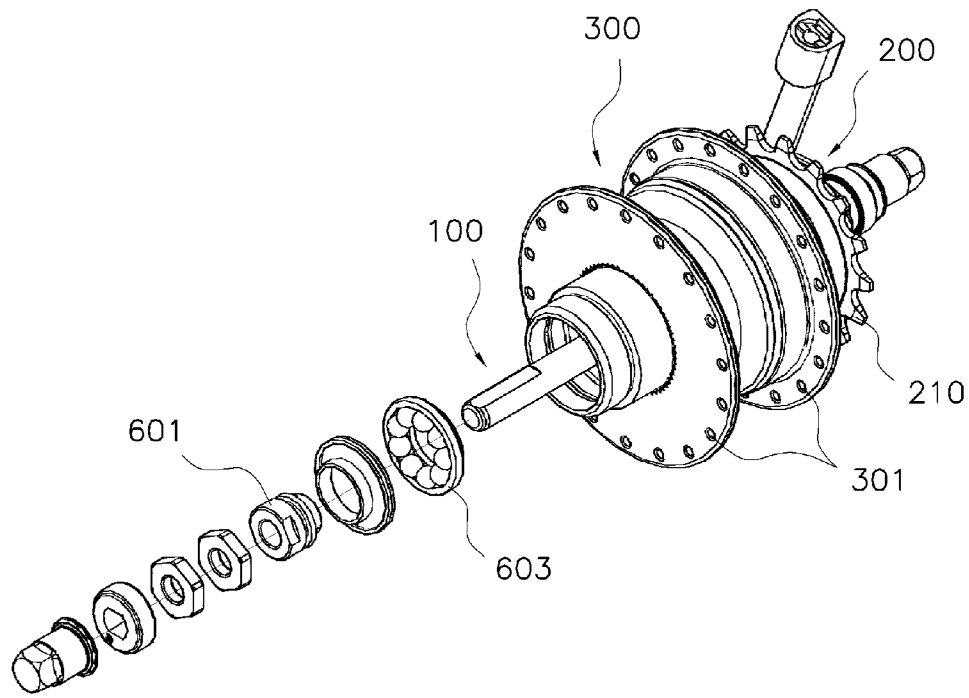
FIG. 11 is a left exploded perspective view showing a disassembled state of a left fastening means in the hub-embedded transmission having the shifting manipulation-assisting device according to the present invention.
Figure 12:
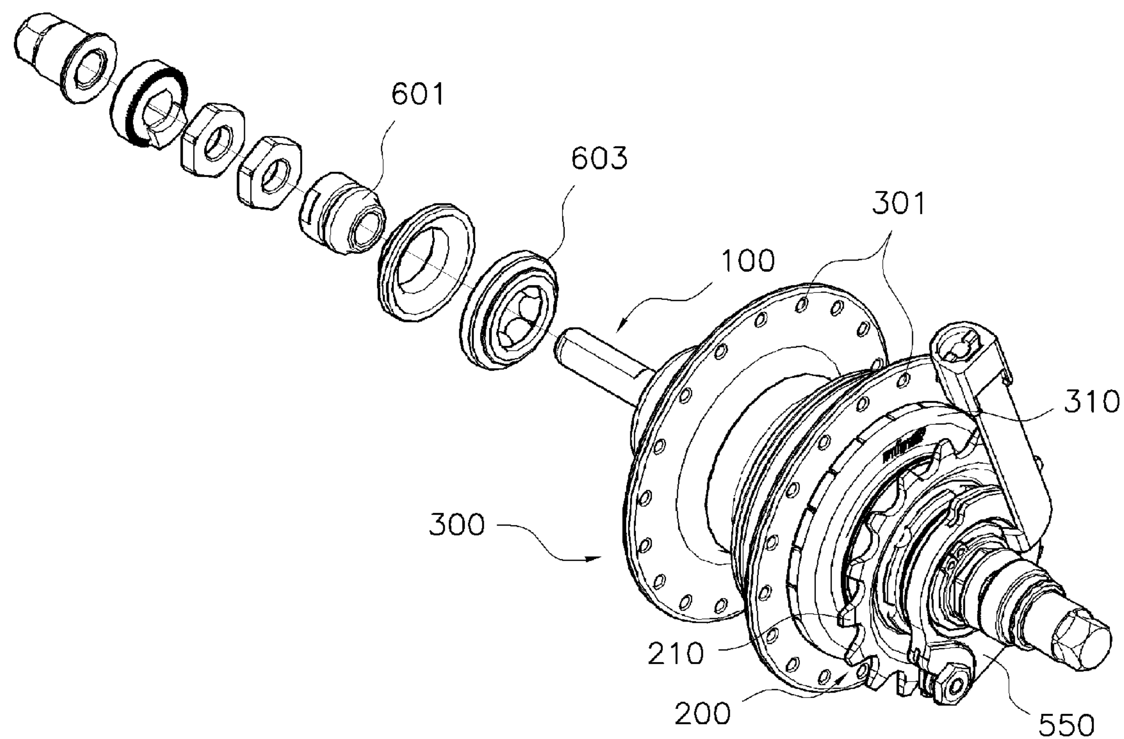
FIG. 12 is a right exploded perspective view showing the disassembled state of the left fastening means in the hub-embedded transmission having the shifting manipulation-assisting device according to the present invention.

In addition, FIG. 11 is a left exploded perspective view showing a disassembled state of a left fastening means in the hub-embedded transmission having the shifting manipulation-assisting device according to the present invention, and FIG. 12 is a right exploded perspective view showing the disassembled state of the left fastening means in the hub-embedded transmission having the shifting manipulation-assisting device according to the present invention.

Figure 13:
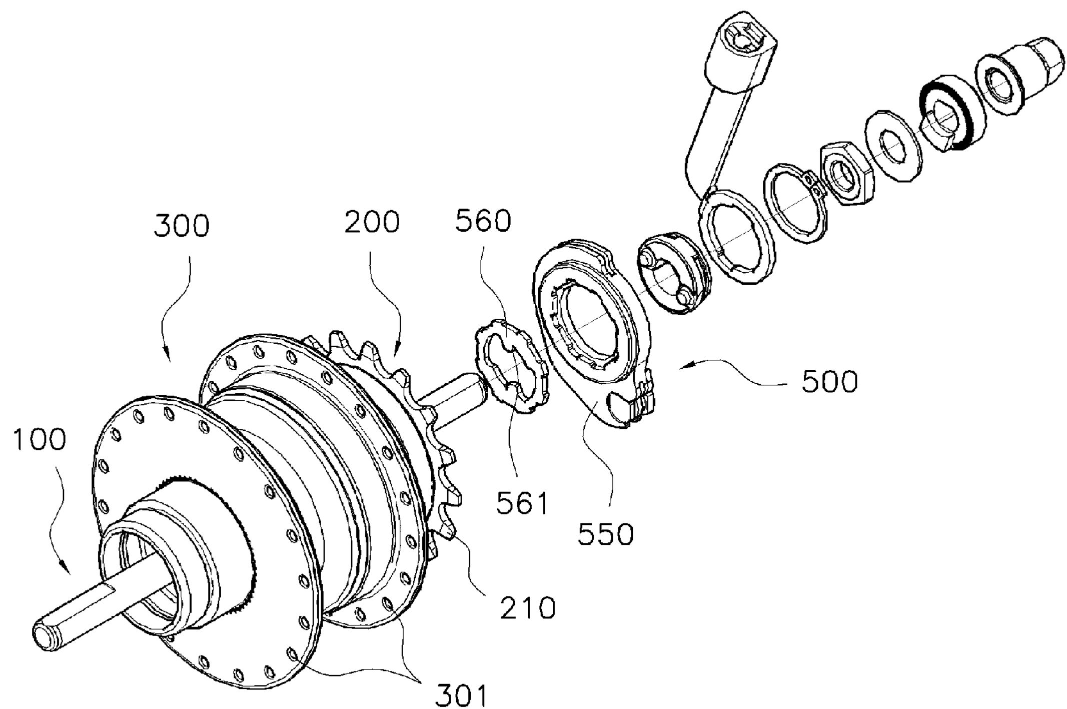
FIG. 13 is a left exploded perspective view showing a disassembled state of a right fastening means in the hub-embedded transmission having the shifting manipulation-assisting device according to the present invention.
Figure 14:
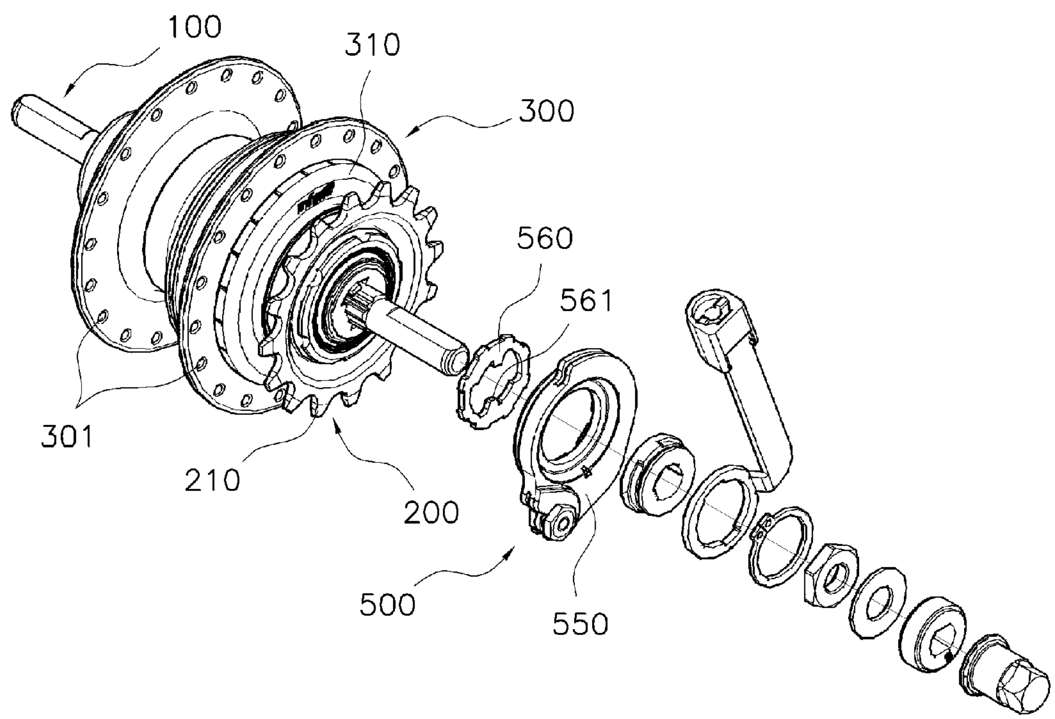
FIG. 14 is a right exploded perspective view showing the disassembled state of the right fastening means in the hub-embedded transmission having the shifting manipulation-assisting device according to the present invention.

FIG. 13 is a left exploded perspective view showing a disassembled state of a right fastening means in the hub-embedded transmission having the shifting manipulation-assisting device according to the present invention, and FIG. 14 is a right exploded perspective view showing the disassembled state of the right fastening means in the hub-embedded transmission having the shifting manipulation-assisting device according to the present invention.

Figure 15:
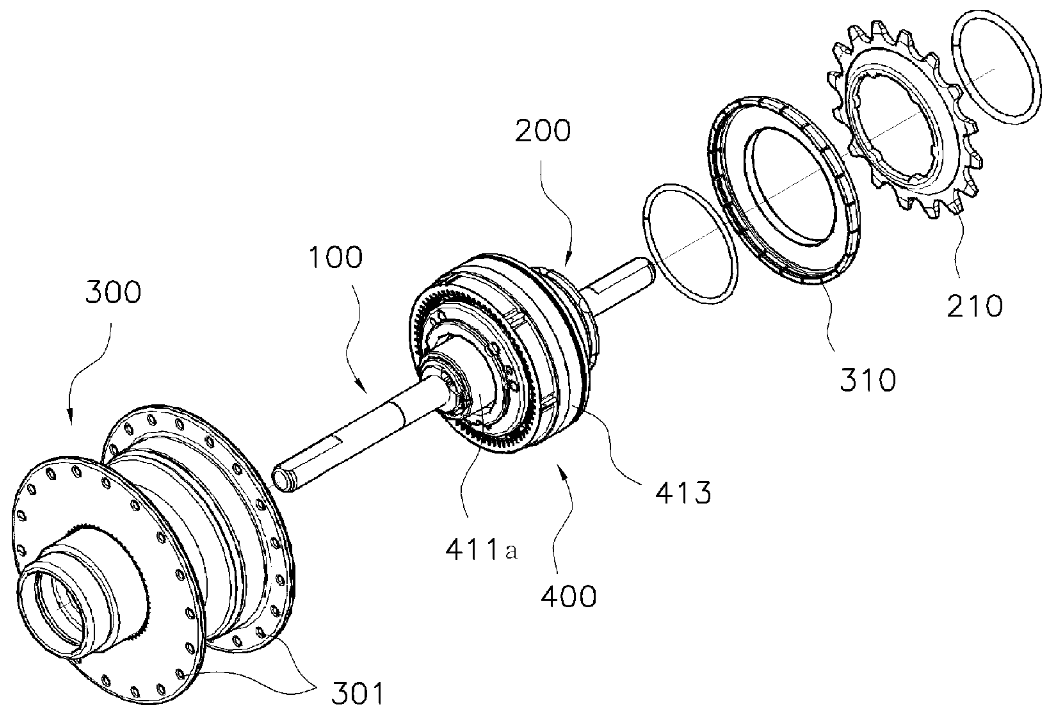
FIG. 15 is a left exploded perspective view showing a disassembled state of a hub shell in the hub-embedded transmission having the shifting manipulation-assisting device according to the present invention.
Figure 16:
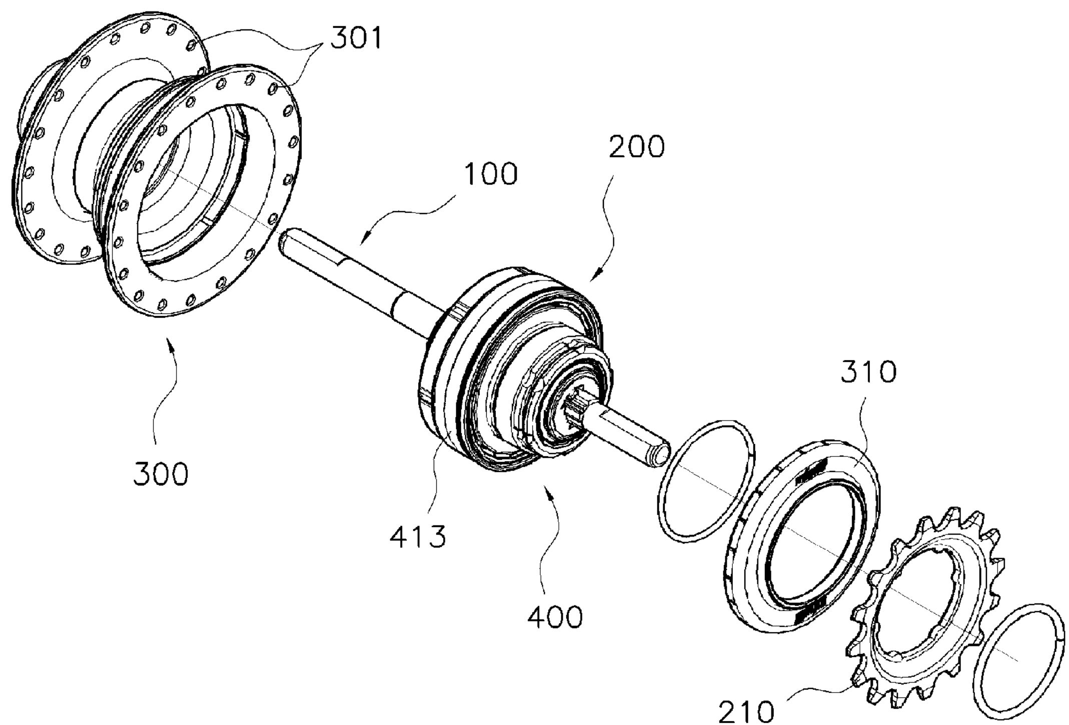
FIG. 16 is a right exploded perspective view showing the disassembled state of the hub shell in the hub-embedded transmission having the shifting manipulation-assisting device according to the present invention.

Further, FIG. 15 is a left exploded perspective view showing a disassembled state of a hub shell in the hub-embedded transmission having the shifting manipulation-assisting device according to the present invention, and FIG. 16 is a right exploded perspective view showing the disassembled state of the hub shell in the hub-embedded transmission having the shifting manipulation-assisting device according to the present invention.

Figure 17:
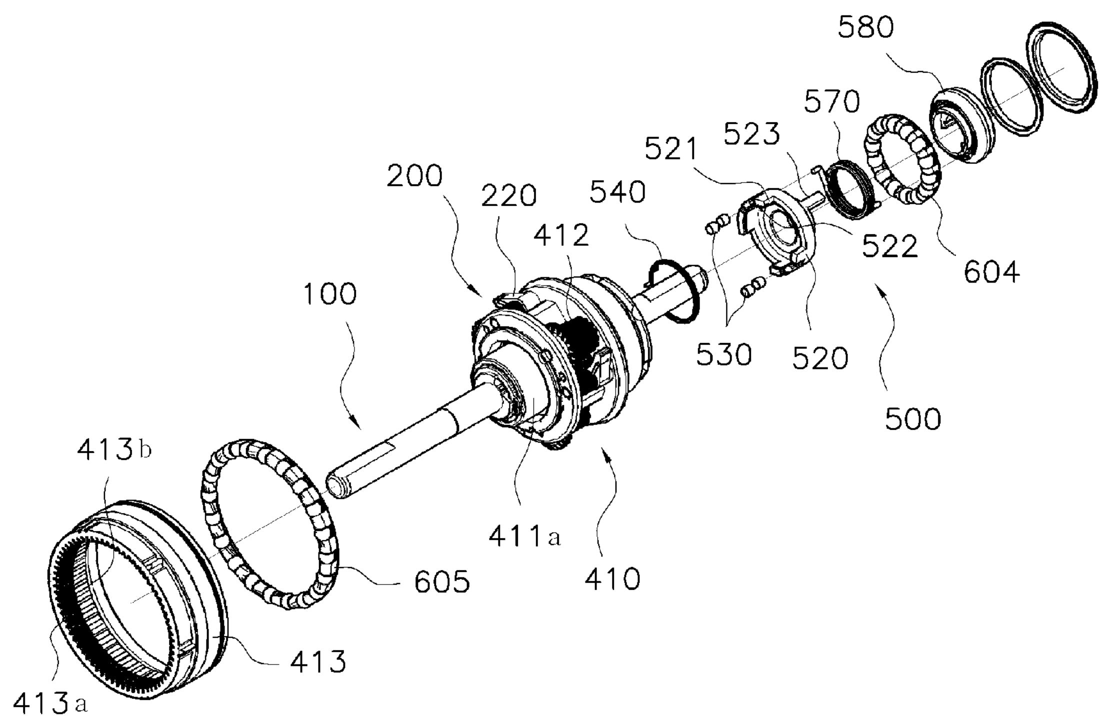
FIG. 17 is a left exploded perspective view showing a disassembled state of a ring gear in the hub-embedded transmission having the shifting manipulation-assisting device according to the present invention.
Figure 18:
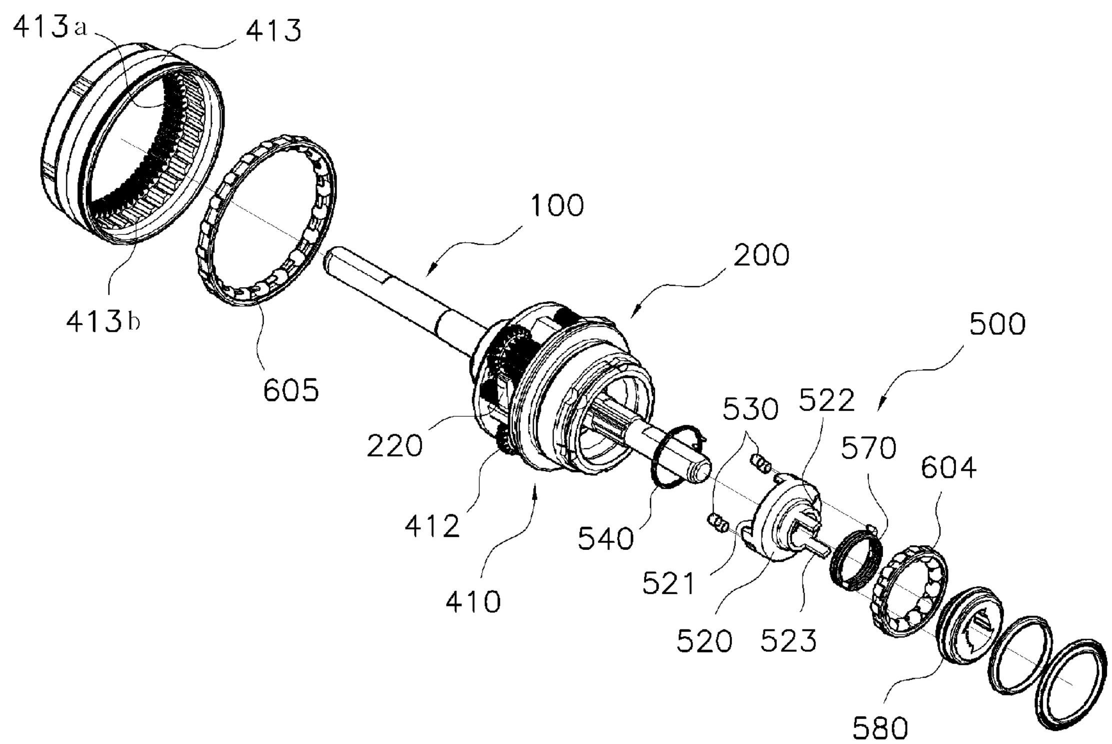
FIG. 18 is a right exploded perspective view showing the disassembled state of the ring gear in the hub-embedded transmission having the shifting manipulation-assisting device according to the present invention.

Moreover, FIG. 17 is a left exploded perspective view showing a disassembled state of a ring gear in the hub-embedded transmission having the shifting manipulation-assisting device according to the present invention, and FIG. 18 is a right exploded perspective view showing the disassembled state of the ring gear in the hub-embedded transmission having the shifting manipulation-assisting device according to the present invention.

Figure 19:
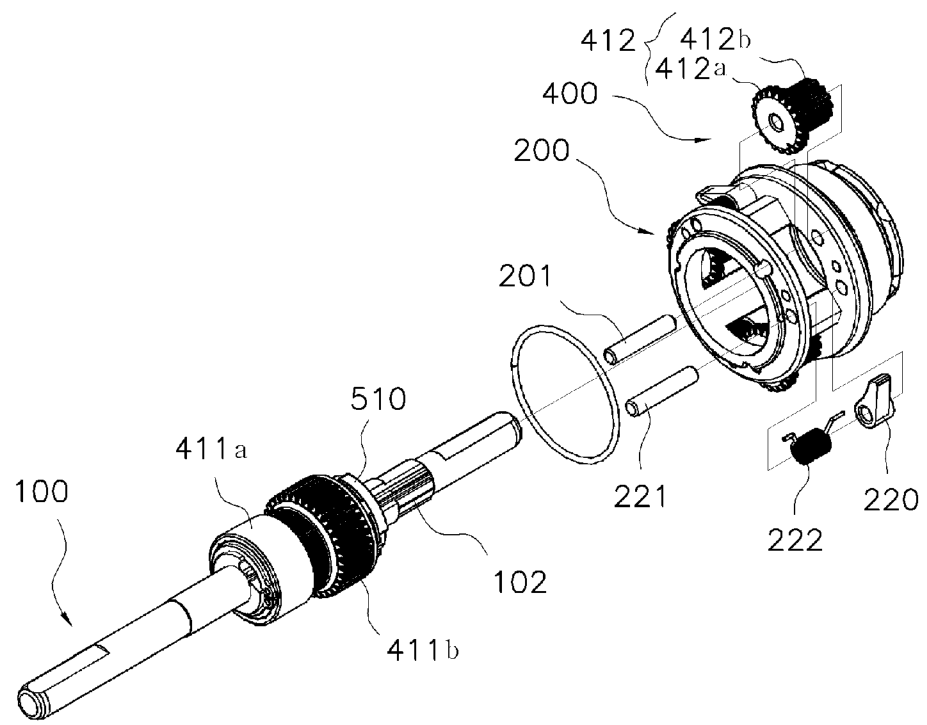
FIG. 19 is a left exploded perspective view showing a disassembled state of a driver in the hub-embedded transmission having the shifting manipulation-assisting device according to the present invention.
Figure 20:
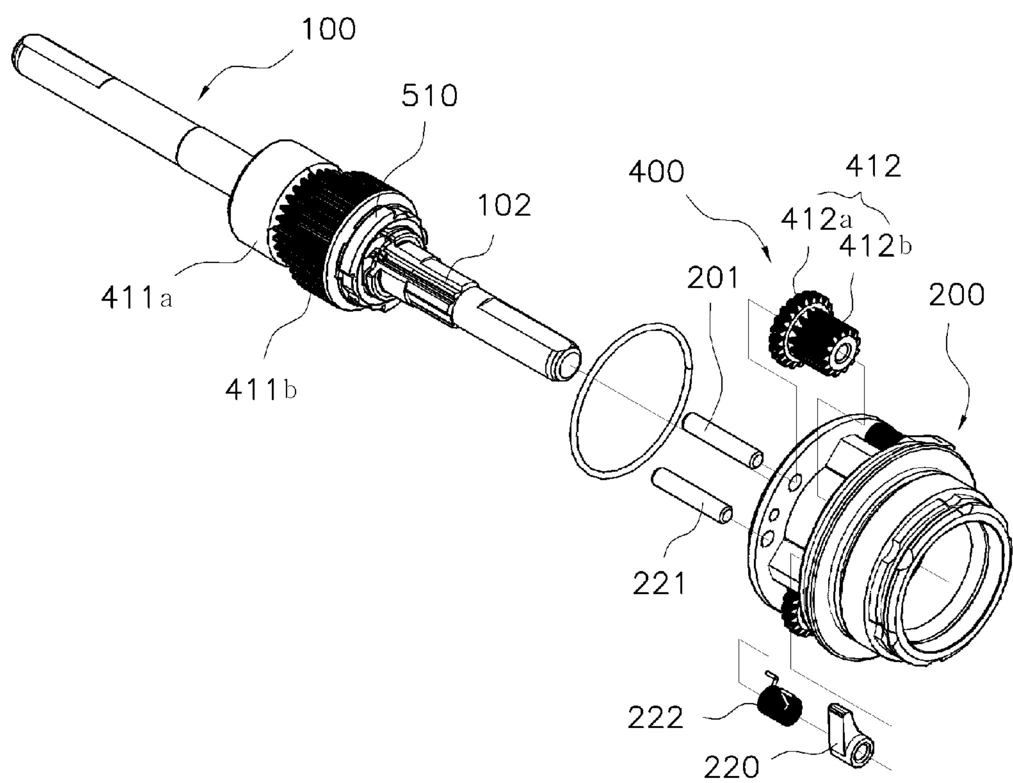
FIG. 20 is a right exploded perspective view showing the disassembled state of the driver in the hub-embedded transmission having the shifting manipulation-assisting device according to the present invention.

In addition, FIG. 19 is a left exploded perspective view showing a disassembled state of a driver in the hub-embedded transmission having the shifting manipulation-assisting device according to the present invention, and FIG. 20 is a right exploded perspective view showing the disassembled state of the driver in the hub-embedded transmission having the shifting manipulation-assisting device according to the present invention.

Figure 21:
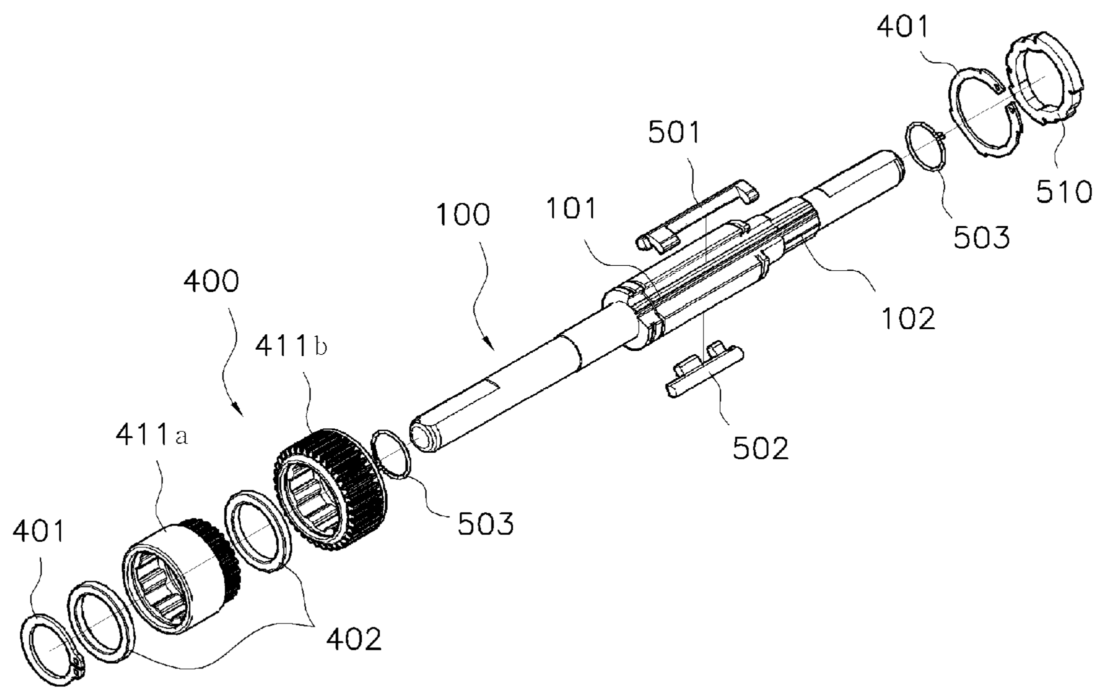
FIG. 21 is a left exploded perspective view showing a disassembled state of sun gears in the hub-embedded transmission having the shifting manipulation-assisting device according to the present invention.
Figure 22:
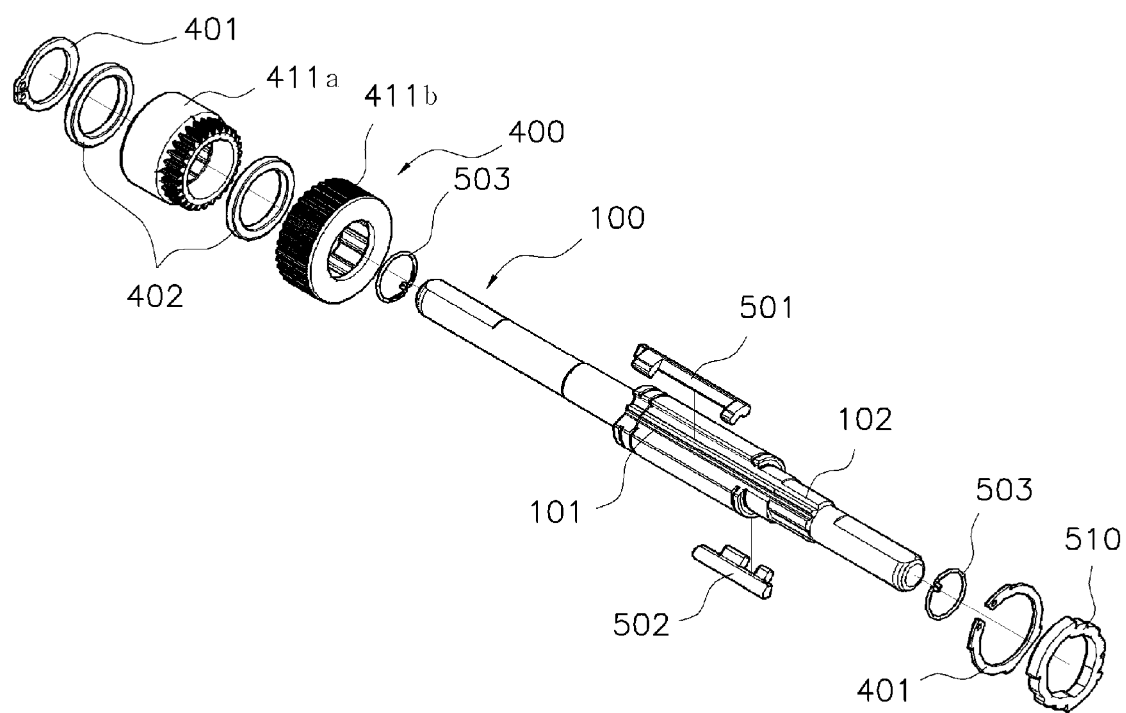
FIG. 22 is a right exploded perspective view showing the disassembled state of the sun gears in the hub-embedded transmission having the shifting manipulation-assisting device according to the present invention.

Finally, FIG. 21 is a left exploded perspective view showing a disassembled state of sun gears in the hub-embedded transmission having the shifting manipulation-assisting device according to the present invention, and FIG. 22 is a right exploded perspective view showing the disassembled state of the sun gears in the hub-embedded transmission having the shifting manipulation-assisting device according to the present invention.

The shifting manipulation-assisting device and the hub-embedded transmission having the same according to the present invention is basically characterized in that shifting control can be smoothly performed in a transmission having a planetary gear set and forced shifting is simultaneously allowed to be properly performed by arbitrarily adjusting a pressured frictional force, thereby preventing damage to components to improve durability, preventing a large shifting shock to enhance user's convenience and driving stability, and maximizing marketability and market competitiveness of the transmission.

A preferred embodiment of the present invention will be described in detail below with reference to the accompanying drawings.

First, as shown in FIGS. 1 to 6, a shifting manipulation-assisting device according to the present invention preferably includes a pawl control ring 510 having an inner peripheral surface configured to control laying-down of control pawls 501 and 502 provided on a shaft 100 depending on a rotation angle, and an outer peripheral surface formed with rotation restricting protrusions 511 and unidirectionally inclined recesses 512; an angle control member 520 positioned on an inner periphery side of a driver 200 rotated by receiving a rotational force and supported on the shaft 100, wherein the angle control member 520 is rotated in response to shifting manipulation and has an outer periphery formed with rotation restricting depressions 521 for accommodating the rotation restricting protrusions 511 with a free-rotation gap in a circumferential direction; pressing members 530 formed in a spherical or cylindrical shape, supported on the angle control member 520 so as to be movable in a radial direction, and positioned between the unidirectionally inclined recesses 512 of the pawl control ring 510 and an inner peripheral surface of the driver 200; an elastic connecting body 540 connected between the pawl control ring 510 and the angle control member 520 to resiliently support the pawl control ring 510 such that the pawl control ring 510 is rotated with respect to the angle control member 520; a fixed support member 580 non-rotatably fixed to the shaft 100 and rotatably supporting the driver 200 via a bearing 604; and a return spring 570 connected between the angle control member 520 and the fixed support member 580 to resiliently and reversely rotate and accordingly return the angle control member 520 that has been rotated in one direction in response to the shifting manipulation, In other words, the shifting manipulation-assisting device of the present invention largely includes the pawl control ring 510, the angle control member 520, the pressing members 530, the elastic connecting body 540, the fixed support member 580, and the return spring 570.

This shifting manipulation-assisting device of the present invention is basically provided in a transmission including a planetary gear set, and has a shifting control function for performing shifting by selectively controlling rotation of the sun gears by means of control of the plurality of control pawls 501 and 502 provided on the outer peripheral surface of the shaft 100 while being rotated in the circumferential direction in response to manipulation of a shift lever (not shown).

It will be possible to increase or decrease the number of stages of the planetary gears constituting the planetary gear set. Hereinafter, for convenience of explanation, a description will be made based on an example provided with a two-stage planetary gear, but the present invention is not limited thereto. For example, a one-stage planetary gear or a three or more-stage planetary gear may be provided.

Further, since in a loaded driving state, these control pawls 501 and 502 are strongly engaged with ratchets formed on inner peripheral surfaces of the sun gears, there was a concern about occurrence of a phenomenon that the control pawls 501 and 502 did not release from the ratchets of the sun gears during shifting control so that shifting was not smoothly performed. However, according to the shifting manipulation-assisting device of the present invention, a user is allowed to smoothly perform the shifting control by means of a forced shifting function even in such loaded driving state.

In particular, the present invention has a greatest characteristic in that since it is possible to appropriately increase or decrease a pressured frictional force generated between the driver 200, which is a rotary body, and the pressing members 530, which are restraint bodies, during forced shifting, the forced shifting function is properly performed.

That is, the shifting manipulation-assisting device of the present invention has a great difference in that it basically has the shifting control function and the forced shifting function and additionally can appropriately adjust increasing or decreasing the magnitude of the pressured frictional force by which the forced shifting function can be achieved.

In this shifting manipulation-assisting device of the present invention, the pawl control ring 510 is substantially ring-shaped, and has grooves 513 and 514 concavely formed on the inner peripheral surface of the pawl control ring.

Therefore, when the grooves 513 and 514 are positioned outside of the control pawls 501 and 502 as shown in FIG. 5 (*c*) in accordance with a circumferential rotation angle of the pawl control ring 510, the corresponding control pawls 501 and 502 may be resiliently erected; and when the grooves 513 and 514 are not positioned outside of the control pawls 501 and 502 as shown in FIG. 5 (*a*), the corresponding control pawls 501 and 502 can be laid down and placed within pawl seating portions 101.

Moreover, the rotation restricting protrusions 511 and the unidirectionally inclined recesses 512 are formed on the outer peripheral surface of the pawl control ring 510.

The rotation restricting protrusions 511 are protruding portions formed with certain angle range in the circumferential direction, and these rotation restricting protrusions 511 will be positioned within the rotation restricting depressions 521 of the angle control member 520 to be described later.

Moreover, the unidirectionally inclined recesses 512 are concave portions formed to be inclined with respect to the outer peripheral surface of the pawl control ring 510 and both sides of the unidirectionally inclined recesses are at different inclination angles to have directionality. The pressing members 530 to be described later will be positioned within these unidirectionally inclined recesses 512.

In particular, in the unidirectionally inclined recess 512, an inclined surface on one side thereof simply corresponds to a movement-enabling inclined surface for moving the pressing member 530 to be described below, and an opposite inclined surface corresponds to a restraining inclined surface for causing the pressing member 530 to be restrained within the unidirectionally inclined recess 512.

The inclination angle of the unidirectionally inclined recess 512 mentioned below refers to an angle at which the restraining inclined surface illustrated in FIG. 6 is formed.

Next, the angle control member 520 is configured to rotate in accordance with shifting manipulation and to transmit a rotational force to the aforementioned pawl control ring 510, is rotatably supported on the outer peripheral surface of the shaft 100 which is non-rotatably fixed, and is positioned on an inner peripheral side of the driver 200 that is rotated by a rotational force received from the outside.

The rotation restricting depressions 521 for accommodating the rotation restricting protrusions 511 of the pawl control ring 510 are formed on an outer periphery of the angle control member 520 with a free-rotation gap in the circumferential direction.

In order for the rotation restricting depressions 521 to accommodate the rotation restricting protrusions 511 with the free-rotation gap in the circumferential direction, the angle range over which the rotation restricting depressions 521 are formed are somewhat greater than the angle range over which the rotation restriction protrusions 511 are formed.

In addition, the pressing members 530 are positioned within the unidirectionally inclined recesses 512 of the aforementioned pawl control ring 510, and the figures show that four pressing members 530 are provided in one angle control member 520.

The pressing members 530 are formed in spherical or cylindrical shapes and supported by the angle control member 520 so as to be movable in a radial direction, so that they are positioned between the unidirectionally inclined recesses 512 of the pawl control ring 510 and the inner peripheral surface of the driver 200.

The elastic connecting body 540 illustrated in FIG. 3 is connected between the pawl control ring 510 and the angle control member 520.

Both ends of the elastic connecting body 540 can be bent at right angles, and the bent portions can be inserted into and caught in a catching groove 515 formed in the pawl control ring 510 and an assembling hole 522 formed in the angle control member 520, respectively, thereby performing assembly of them.

Accordingly, it is possible to resiliently support the pawl control ring 510 to be rotated in a clockwise direction in FIGS. 5 and 6 with respect to the angle control member 520.

As such, since the rotation restricting protrusion 511 protruding from the outer peripheral surface of the pawl control ring 510 is formed to have a width slightly narrower than that of the rotation restricting depression 521 formed in the angle control member 520, a certain phase angle difference in the circumferential direction may be generated between the pawl control ring 510 and the angle control member 520 as shown in FIGS. 5 (*d*) and 5 (*e*).

Accordingly, the pawl control ring 510 is resiliently supported to be always rotated in a clockwise direction when viewed from a right side of the figure with respect to the angle control member 520, so that the rotation restricting protrusions 511 are positioned within the rotation restricting depressions 521 but are always rotated in the clockwise direction unless an external force is applied, whereby they are maintained in contact with each other.

In this state, when a user manipulates the shift lever for shifting from a low stage to a high stage, the angle control member 520 is rotated in a counterclockwise direction from FIG. 5 (*a*) to FIG. 5 (*b*) or from FIG. 5 (*b*) to FIG. 5 (*c*), and the pawl control ring 510 is also correspondingly rotated together with the angle control member 520 in the counterclockwise direction.

As a result, the corresponding control pawls 501 and 502 positioned in the grooves 513 and 514 of the pawl control ring 510 are resiliently erected, so that upshifting may be performed.

FIG. 5 (*a*) shows a state where all the control pawls 501 and 502 are laid down, FIG. 5 (*b*) shows a state where the first control pawl 501 is erected and the second control pawl 502 is laid down, and FIG. 5 (*c*) shows a state where all the control pawls 501 and 502 are erected.

On the contrary, when the user manipulates the shift lever for downshifting from a high stage to a low stage, the angle control member 520 is rotated in the clockwise direction, and the rotation of the angle control member 520 in the clockwise direction is caused by the fixed support member 580 and the return spring 570 which will be described later.

Accordingly, the pawl control ring 510 is also rotated in the clockwise direction by the elastic connecting body 540 connected between the angle control member 520 and the pawl control ring 510.

As a result, the control pawls 501 and 502 positioned in the grooves 513 and 514 of the pawl control ring 510 are laid down from FIG. 5 (*c*) to FIG. 5 (*b*) or from FIG. 5 (*b*) to FIG. 5 (*a*), so that downshifting may be performed.

However, when the control pawls 501 and 502 are strongly engaged with the ratchets of the sun gears as in the loaded driving state, the pawl control ring 510 is prevented from being rotated together with the angle control member 520 in the clockwise direction by an elastic restoring force of the elastic connecting body 540 and a certain phase angle difference may be generated in the circumferential direction as shown in FIG. 5 (*d*).

In this case, the pressing members 530 come into contact with the inclined surfaces of the unidirectionally inclined recesses 512 and then move outwardly, and come into pressured frictional contact with the inner peripheral surface of the driver 200 which is being rotated outside the pressing members 530.

Accordingly, the rotational force of the driver 200 is transmitted to the pawl control ring 510 through the pressing members 530 by the pressured frictional force generated between the driver 200 and the pressing members 530.

Therefore, without depending only on the elastic restoring force of the elastic connecting member 540, the rotational force of the driver 200 is strongly transmitted to the pawl control ring 510 in the clockwise direction as in FIG. 5 (*e*) to forcibly rotate the pawl control ring 510.

As a result, the pawl control ring 510 can be rotated in the clockwise direction to forcibly lie down the corresponding control pawls 501 and 502 which have been strongly engaged with the ratchets of the sun gear, thereby completing the downshifting.

Therefore, as the phase angle difference is generated in the circumferential direction between the angle control member 520 and the pawl control ring 510, the pressing members 530 ride on and outwardly move along the unidirectionally inclined recesses 512 and come into pressured frictional contact with the inner peripheral surface of the driver 200, thereby pressing and rotating the pawl control ring 510 to enable the control pawls 501 and 502 to be forcibly laid down.

Next, the fixed support member 580 is formed to have a generally conical shape, and is non-rotatably fixed to the shaft 100.

To this end, irregularities 582 are formed on an inner peripheral surface of the fixed support member 580 as shown in FIGS. 3 and 4, and these irregularities 582 are axially assembled to irregularities 102 formed on the shaft 100, so that the fixed support member 580 is non-rotatably fixed to the shaft 100.

In addition, the bearing 604 is provided on an outer periphery of the fixed support member 580, so that the driver 200 which is rotated by the rotational force received from the outside is rotatably supported independently of the shaft 100.

Finally, the return spring 570 is connected between the angle control member 520 and the fixed support member 580 so as to serve to resiliently rotate and return the angle control member 520, which have been rotated in the counterclockwise direction as described above in response to the shifting manipulation for acceleration, in the clockwise direction during shifting manipulation for deceleration.

To this end, both ends of the return spring 570 are also bent at right angles, and these bent portions can be assembled to be inserted into and caught in an assembling hole 524 formed in the angle control member 520 and an assembling hole 581 formed in the fixed support member 580, respectively, as shown in FIGS. 3 and 4.

As a result, the angle control member 520 and the pawl control ring 510 are rotated in the counterclockwise direction in response to the shifting manipulation for acceleration as described above, and the return spring 570 may resiliently return the angle control member 520 in the clockwise direction in response to the shifting manipulation for deceleration.

Accordingly, the shifting manipulation-assisting device of the present invention can basically perform the forced shifting function in the loaded driving state together with the shifting control function of upshifting and downshifting by the shift lever.

As described above, the forced shifting function is performed by the pressured frictional force generated between the driver 200, which is a rotary body, and the pressing members 530 which are restraint bodies.

In the process of further developing a transmission having the forced shifting function as described above, the inventor found that adjustment of the pressured frictional force generated between the driver 200 and the pressing member 530 becomes an important variable for the transmission.

For example, if the pressured frictional force generated between the driver 200 and the pressing member 530 is simply set to be high, when forced shifting is performed in a state where an applied load is high, there is a high risk of occurrence of a safety accident due to damage to the control pawls 501 and 502 and large shifting shock.

On the contrary, if the pressured frictional force generated between the driver 200 and the pressuring member 530 is simply set to be low, a desired pressured frictional force is not generated between the driver 200 and the pressuring member 530 and a slip occurs at a contact surface therebetween, so that there was also a phenomenon that desired forced shifting was not achieved.

Accordingly, it was found that with the present invention, the pressured frictional force mutually applied between the driver 200 and the pressing member 530 can be appropriately adjusted by properly setting the inclination angle of the unidirectionally inclined recess 512 with respect to the outer peripheral surface of the pawl control ring 510 or an elastic modulus of the return spring 570.

Here, the inclination angle of the unidirectionally inclined recess 512 refers to an angle defined by the restraining inclined surface and the outer peripheral surface of the pawl control ring 510 as described above.

That is, it is possible to properly adjust the pressured frictional force generated between the driver 200 and the pressing member 530 by properly setting the inclination angle of the unidirectionally inclined recess 512 in the pawl control ring 510 and the elastic modulus of the return spring 570.

In other words, in the present invention, it will be preferable that the smaller the inclination angle of the unidirectionally inclined recesses 512 with respect to the outer peripheral surface of the pawl control ring 510 is or the greater the elastic modulus of the return spring 570 is, the higher the pressured frictional force generated between the driver 200 and the pressing members 530 can be; and that the larger the inclination angle of the unidirectionally inclined recesses 512 with respect to the outer peripheral surface of the pawl control ring 510 is or the smaller the elastic modulus of the return spring 570 is, the lower the pressured frictional force generated between the driver 200 and the pressing members 530 can be.

Accordingly, for example, in a state where a higher rotational load is exerted as a traveling apparatus goes on an uphill road having a slope above a certain angle, a slip is induced above a predetermined level of the pressured frictional force generated mutually between the driver 200 and the pressing member 530, so that forced shifting is not performed, thereby preventing damage to components as well as a safety accident due to a large shifting shock.

In addition, it is also possible to induce smooth shifting by inducing the mutual pressured frictional force between the driver 200 and the pressing member 530 even when a relatively small rotational load is exerted, and thus, by allowing forced shifting to be easily performed.

Furthermore, the present inventor conducted tests by variously changing the inclination angle of the unidirectionally inclined recess 512 with respect to the outer peripheral surface of the pawl control ring 510, and as a result, it was confirmed in particular that it is most preferable that the inclination angle of the unidirectionally inclined recess 512 with respect to the outer peripheral surface of the pawl control ring 510 is 12° to 20°.

If such inclination angle was designed to be less than 12°, it was confirmed that the magnitude of the pressured frictional force generated between the driver 200 and the pressing member 530 was too large, causing damage to the components or occurrence of a severe shifting shock.

In addition, if such inclination angle was designed to exceed 20°, a slip too easily occurs between the unidirectionally inclined recess 512 and the inner peripheral surface of the driver 200, and thus a phenomenon that restraint of the pressing member 530 by the pressured frictional force was not smoothly achieved was occurred.

That is, it has been found in the present invention that it is most preferable to limit the inclination angle of the unidirectionally inclined recess 512 with respect to the outer peripheral surface of the pawl control ring 510 to 12° to 20°.

Hereinafter, an example in which the aforementioned shifting manipulation-assisting device of the present invention is actually applied to a hub-embedded transmission will be described.

That is, as shown in FIGS. 7 to 10, a hub-embedded transmission having a shifting manipulation-assisting device according to the present invention includes a shaft 100 fixed to a vehicle body; a driver 200 and a hub shell 300 rotatably positioned on around of the shaft 100, wherein the driver 200 receives a rotational force and the hub shell 300 outputs the rotational force; a shifting unit 400 including a planetary gear set 410 provided in the hub shell 300, wherein the planetary gear set 410 includes sun gears 411*a* and 411*b*, planetary gears 412 and a ring gear 413, the driver 200 rotatably supports the planetary gears 412 so as to serve as a carrier, the driver 200 is provided with elastic pawls 220 resiliently supported to protrude outwardly, and an inner peripheral surface of the ring gear 430 is further formed with first teeth 413*a* to be engaged with the planetary gears 412 and second teeth 413*b* to be engaged with the elastic pawls 220, whereby the shifting unit 400 shifts a rotational force received from the driver and outputs a shifted rotational force to the hub shell 300; and a control unit 500 including the aforementioned shifting manipulation-assisting device and configured to control control pawls 501 and 502 positioned in pawl seating portions 101 formed on the outer peripheral surface of the shaft 100 while the control unit 500 is rotated in a circumferential direction in response to manipulation of a shift lever, so as to selectively restrain rotation of the sun gears 411*a* and 411*b*, thereby controlling shifting of the shifting unit 400.

Therefore, the hub-embedded transmission provided with the shifting manipulation-assisting device of the present invention largely consists of the shaft 100, the driver 200, the hub shell 300, the shifting unit 400, and the control unit 500 including the aforementioned shifting manipulation-assisting device.

First, the shaft 100 has both ends fixedly and non-rotatably supported, with fastening means such as fastener nuts, to a body of a scooter, a bicycle, a rickshaw or the like (hereinafter, referred to as a "traveling apparatus") that requires shifting.

The shaft 100 is configured to have different diameters at respective longitudinal portions thereof as shown in FIGS. 21 and 22. In particular, pawl seating portions 101 corresponding to the number of the control pawls 501 and 502 are concavely formed with a certain phase angle difference on an outer peripheral surface of a central portion of the shaft 100, so that the control pawls 501 and 502 are positioned in the pawl seating portions 101, respectively.

This shaft 100 constructs a framework of the present invention, and all components to be described later are rotatably or non-rotatably provided on around of the shaft 100.

Next, the driver 200 is configured to allow the hub-embedded transmission having the shifting manipulation-assisting device of the present invention to receive a rotational force such as manpower or an electromotive force from the traveling apparatus and is rotatably provided on one side of the shaft 100.

As described above and as shown in FIGS. 17 and 18, the fixed support member 580 non-rotatably coupled to the shaft 100 and the bearing 604 mounted on an outer periphery of the fixed support member 580 are provided on an inner peripheral surface of the driver 200 on the right side when viewed in the figures, so that the driver 200 is supported to be rotatable independent of the shaft 100.

In particular, a sprocket 210 is fixed to the driver 200 such that they are integrally rotated, whereby the sprocket 210 receives a driving force from the outside, e.g., through a power transmitting means such as a chain, and causes the driver 200 to be rotated integrally therewith.

Further, the hub shell 300 is configured to be positioned on the outermost side of the shaft 100 and to output a driven force, which is obtained through shifting, to wheels or the like of the traveling apparatus.

This hub shell 300 has a generally cylindrical shape, a plurality of holes 301 to which spokes of a wheel can be connected can be formed on an outer periphery of the hub shell, and various components may be inserted into and assembled in the hub shell.

Here, a cone nut 601 and a bearing 603 coupled to the shaft 100 are provided on an inner peripheral surface of the hub shell 300 on the left side as shown in FIGS. 11 and 12, so that the hub shell 300 is supported to be rotatable independent of the shaft 100.

Next, the shifting unit 400 is positioned within the hub shell 300 to shift rotation, which is input through the driver 200, in multiple stages and then to output the rotational force, which is obtained through the shifting, through the hub shell 300. This shifting unit 400 includes the planetary gear set 410.

In the present invention, substantial shifting is performed in the planetary gear set 410, and the rotational force obtained through the shifting is then output to the hub shell 300.

The planetary gear set 410 includes the sun gears 411*a* and 411*b*, the planetary gears 412, and the ring gear 413. In particular, in the present invention, a separate carrier is not provided, and the aforementioned driver 200 rotatably supports the planetary gears 412 and thus serves as a carrier.

In FIGS. 19 and 20, reference numeral 201 designates a support shaft for rotatably supporting the planetary gears 412 to the driver 200. Although the figures illustrate that three planetary gears 412 are provided on one driver 200, it will be possible to appropriately increase or decrease the number of the planetary gears 412.

Of course, it would also be possible to provide a separate carrier that is configured to be rotated integrally with the driver 200.

Accordingly, the planetary gears 412 are rotatably supported on the driver 200, the sun gears 411*a* and 411*b* are positioned inside the driver 200 such that the sun gears are engaged with inner portions of the planetary gears 412, and the ring gear 413 is provided outside the driver 200 such that the ring gear is engaged with outer portions of the planetary gears 412.

In particular, in the present invention, the driver 200 is provided with the elastic pawls 220 that are resiliently supported to protrude outwardly.

This elastic pawls 220 are rotatably supported on the driver 200 through supporting shafts 221. In addition thereto, the elastic pawls 220 are resiliently supported by separate coil springs 222 so as to be rotated in one direction.

Accordingly, the elastic pawls 220 may perform a function similar to that of a well-known one-way clutch, and the figures illustrate that three elastic pawls 220 are provided in one driver 200.

Furthermore, as shown in FIGS. 17 and 18, the inner peripheral surface of the ring gear 413 is further formed with the first teeth 413*a* configured to be engaged with the planetary gears 412 and the second teeth 413*b* configured to be engaged with the elastic pawls 220.

As a result, the rotational force, which is obtained through shifting in the planetary gear set 410, is transmitted to the first teeth 413*a* of the ring gear 413 through the planetary gears 412.

Moreover, the rotational force input to the driver 200 may be transmitted to the second teeth 413*b* of the ring gear 413 through the elastic pawl 220 without separate shifting.

That is, when upshifting is not performed in the planetary gear set 410, the rotational force of the driver 200 is directly output to the ring gear 413 through the elastic pawls 220, and when upshifting is performed in the planetary gear set 410, a rotational speed that is obtained through shifting by and transmitted through the planetary gears 412 is higher than a rotational speed of the driver 200 so that there is no transmission of the rotational force by the aforementioned elastic pawls 220.

The rotational force transmitted to the ring gear 413 as described above is intactly transmitted to the hub shell 300 positioned on the outer periphery of the ring gear. To this end, an outer peripheral surface of the ring gear 413 and the inner peripheral surface of the hub shell 300 are engaged with each other via teeth.

Therefore, the rotational force of the driver 200 may be intactly transmitted to the hub shell 300 in absence of acceleration, or may be transmitted to the hub shell 300 through upshifting in the planetary gear set 410.

At this time, when the rotational force is input to the driver 200 and then output to the ring gear 413 through the planetary gears 412, acceleration is achieved.

That is, in the present invention, whether shifting is performed or not in the planetary gear set 410 can be determined based on whether the sun gears 411*a* and 411*b* are rotatable or not. To this end, whether the sun gears 411*a* and 411*b* are rotatable or not can be determined by the control unit 500 to be described later.

Although the control of the control pawls 501 and 502 which determine whether the sun gears 411*a* and 411*b* are rotatable or not has been described above, the control unit 500 will be described once again below.

Accordingly, the rotational force obtained through acceleration by the shifting unit 400 is output to the hub shell 300 through the planetary gears 412 and the ring gear 413, and the rotational force in a directly coupled state is output to the hub shell 300 through the elastic pawls of the driver 200 and the ring gear 413.

Furthermore, a bearing 605 is provided between the inner peripheral surface of the ring gear 413 and an outer peripheral surface of the driver 200 so that the ring gear 413 and the driver 200 are rotatable independently of each other, and a dust cover 310 illustrated in FIGS. 15 and 16 prevents foreign substances from entering a space between the ring gear 413 and the driver 200.

Although the aforementioned bearings 603, 604 and 605 are illustrated as ball bearings, they are not limited to this type of bearing but may be other kinds of bearings such as a sliding bearing.

Finally, the control unit 500 that controls shifting of the shifting unit 400 includes the aforementioned shifting manipulation-assisting device.

The shifting manipulation-assisting device basically controls the plurality of control pawls 501 and 502 provided on the outer peripheral surface of the shaft 100 in response to the manipulation of the shift lever (not shown) so as to perform a shifting control function for selectively restricting the rotation of the sun gears 411*a* and 411*b* and the aforementioned forced shifting function.

In the present invention, the shifting manipulation-assisting device controls the control pawls 501 and 502 provided in the pawl seating portions 101 of the shaft 100 in response to the driver's manipulation of the shift lever as described above so that whether shifting is performed or not in the planetary gear set 410 is determined, whereby a rotational force at a higher rotational speed among an output in the directly coupled state without shifting through the driver 200 and an output in an accelerated state through the planetary gear set 410 is selectively output to the hub shell 300.

In particular, in the present invention, the planetary gears 412 are comprised with one-stage planetary gears or multi-stage planetary gears having two or more stages, and it will be preferable that the control pawls 501 and 502 and the sun gears 411*a* and 411*b* are further configured depending on the number of stages of the planetary gear 412 so as to enable shifting to be performed with the number of shifting stages that is "(the number of stages of the planetary gear)+1".

That is, although not shown, the planetary gear provided in the planetary gear set 410 may be configured as a one-stage planetary gear constructed with only one diameter, or may be configured as a two-stage planetary gear 412 having a larger-diameter portion 412*a* and a smaller-diameter portion 412*b* as illustrated in the figures. Alternatively, although not shown, the planetary gear may be configured as a three-stage planetary gear constructed with three diameters and it is also possible to employ a four or more stage-planetary gear.

For example, if one-stage planetary gears are employed, one pawl is provided at a location corresponding to the pawl seating portion of the shaft and it is possible to implement two shifting ratios: direct coupling and a shifting stage for acceleration by using only one sun gear.

Moreover, if the two-stage planetary gears 412 are employed as illustrated in the figures, the two pawl seating portions 101 are formed on the shaft 100, the control pawls 501 and 502 are provided at the pawl seating portions 101, respectively, and the two sun gears 411*a* and 411*b* are provided to correspond to the larger-diameter portions 412*a* and the smaller-diameter portions 412*b* of the planetary gears 412, so that it is possible to implement total three shifting ratios: direct coupling and two shifting stages for acceleration.

At this time, the first sun gear 411*a* corresponding to the larger-diameter portions 412*a* of the planetary gears 412 will be configured to have a diameter smaller than a diameter of the second sun gear 411*b* corresponding to the smaller-diameter portions 412*b* of the planetary gears 412.

Of course, although not shown, it is also possible to employ three-stage planetary gears 412 and accordingly to increase the number of the control pawls and the number of sun gears to 3 (three), respectively, thereby implementing total four shifting ratios: direct coupling and three shifting stages for acceleration. Similarly, it is also possible to apply a multi-stage planetary gear having four or more stages.

That is, it is possible to obtain direct coupling and different multi-stage shifting ratios for acceleration by applying the multi-stage planetary gears 412 having one or more stages to the planetary gear set 410.

Hereinafter, for convenience of explanation, details of the configurations and operations of the shifting unit 400 and the control unit 500 will be described with reference to the drawings based on the planetary gear set 410 that employs the two-stage planetary gears 412 having the larger-diameter portions 412*a* and the smaller-diameter portions 412*b*. Overlapping description of an embodiment employing one-stage planetary gears or three or more-stage planetary gears will be omitted.

Therefore, as the two-stage planetary gears 412 are employed in one embodiment of the present invention, the sun gears is composed of the first sun gear 411*a* engaged with the larger-diameter portions 412*a* of the planetary gears 412 and the second sun gear 411*b* engaged with the smaller-diameter portions 412*b* of the planetary gears 412, and the first control pawl 501 and the second control pawl 502 are provided on the shaft 100.

In this configuration, rotation of the first sun gear 411*a* is selectively restricted by the first control pawl 501, and rotation of the second sun gear 411*b* is selectively restricted by the second control pawl 502.

In other words, the first control pawl 501 and the second control pawl 502 are positioned within the pawl seating portions 101 on the shaft 100 as shown in FIGS. 21 and 22, respectively, and the control pawls 501 and 502 are provided to be resiliently erected in the pawl seating portions 101 by ring springs 503 placed at both sided of the control pawls.

The pawl control ring 510 having the grooves 513 and 514 concavely formed on the inner periphery thereof is positioned outside the control pawls 501 and 502 provided as such, so that when the corresponding grooves 513 and 514 are positioned outside the control pawls 501 and 502 in accordance with a circumferential rotation angle of the pawl control ring 510 as shown in FIG. 5, the control pawls 501 and 502 are erected; and when the grooves 513 and 514 are not positioned, the control pawls 501 and 502 are laid down and placed within the pawl seating portions 101.

In FIGS. 5 and 6, each of the grooves 513 and 514 is composed of a clearance for allowing the corresponding control pawl 501 or 502 to be freely erected by the ring spring 503 when the pawl control ring 510 is rotated in the counterclockwise direction, and an inclined surface configured to press and lie down the corresponding control pawl 501 or 502 when the pawl control ring 510 is rotated in the clockwise direction.

Moreover, when the control pawls 501 and 502 are erected, the control pawls are engaged with the ratchets of the sun gears 411*a* and 411*b*, which are positioned outside the control pawls, to restrict rotation of the corresponding sun gears 411*a* and 411*b*, thereby performing the shifting control.

The first and second control pawls 501 and 502 controlled by the pawl control ring 510 have control portions and catching portions formed to protrude therefrom at different intervals, respectively. As shown in FIG. 3, the control portion is formed on the right side of each of the first and second control pawls 501 and 502 when viewed in the figure, and the pawl control ring 510 is positioned outside these control portions.

Furthermore, the catching portion of each of the control pawls 501 and 502 is formed to be spaced apart from this control portion by a certain distance toward the left side in the figure.

The control portion and the catching portion of the second control pawl 502 are adjacent to each other, whereas the first control pawl 501 has the control portion and the catching portion further spaced apart from each other as compared with those of the second control pawl 502.

Here, the first sun gear 411*a* is positioned outside the catching portion of the first control pawl 501 and spaced from the pawl control ring 510. The second sun gear 411*b* is positioned outside the catching portion of the second control pawl 502 and adjacent to the pawl control ring 510.

In FIGS. 21 and 22, reference numeral 401 designates a snap ring for preventing the sun gears 411*a* and 411*b* from being disassembled, and reference numeral 402 indicates spacers for maintaining a gap between the sun gears 411*a* and 411*b*.

That is, the first and second control pawls 501 and 502 roughly face each other and are positioned within the pawl seating portions 101 of the shaft 100, respectively.

Accordingly, the pawl control ring 510 is positioned outside the control portions formed on the control pawls 501 and 502, and the first sun gear 411*a* or the second sun gear 411*b* is positioned outside the catching portion formed on each of the control pawls 501 and 502.

Therefore, depending on the rotation angle of the pawl control ring 510, when the control portions of the control pawls 501 and 502 to be resiliently erected are positioned in the grooves 513 and 514, the catching portions of the corresponding control pawls 501 and 502 are erected and are then engaged with the ratchets formed on inner peripheral surfaces of the respective sun gears 411*a* and 411*b* to restrict rotation of the sun gears 411*a* and 411*b*.

A process by which shifting manipulation of a user for the aforementioned control is transmitted to the pawl control ring 510 will be described below.

In the present invention, the control unit 500 includes a cable connecting member 550 rotatably supported on the outer peripheral surface of the shaft 100, wherein a cable to be pulled in response to manipulation of the shift lever is connected to the cable connecting member; and an intermediate connecting member 560 engaged with an inner peripheral surface of the cable connecting member 550 and rotated integrally with the cable connecting member, wherein it is preferable that the angle control member 520 passes through the fixed support member 580 without rotational interference and is assembled to the inner peripheral surface of the intermediate connecting member 560 in order to transmit the rotational force in one direction.

A cable (not shown) to be pulled in response to user's manipulation of the shift lever for acceleration is connected to the cable connecting member 550, so that when the shift lever is manipulated for acceleration, the cable connecting member 550 is rotated in the counterclockwise when viewed from the right side.

The intermediate connecting member 560 is positioned on the inner peripheral surface of the cable connecting member 550, and the inner peripheral surface of the cable connecting member 550 and an outer peripheral surface of the intermediate connecting member 560 are engaged with each other via teeth, so that they are rotated integrally with each other.

Furthermore, the aforementioned angle control member 520 is assembled to an inner peripheral surface of the intermediate connecting member 560.

That is, two protrusions 523 protrude from a right side of the angle control member 520 as shown in FIGS. 17 and 18 and are assembled in coupling recesses 561 formed on the inner peripheral surface of the intermediate connecting member 560. At this time, it will be preferable that the coupling recesses 561 are configured to enable the rotational force to be transmitted to the angle control member 520 only in the counterclockwise direction when viewed from the right side.

The protrusions 523 of the angle control member 520 may pass through the fixed support member 580 and then assembled to the intermediate connecting member 560, and the protrusions 523 are configured not to generate interference with an inner peripheral surface of the fixed support member 580 when rotated.

In addition, the return spring 570 is provided between the angle control member 520 and the fixed support member 580, so that the angle control member 520 is resiliently supported by the return spring 570 so as to be rotated in the clockwise direction when viewed from the right side.

Accordingly, upon manipulation for deceleration, the return spring 570 resiliently rotates the angle control member 520, which has been rotated in the counterclockwise direction in response to the manipulation of the shift lever for acceleration, in the clockwise direction.

Moreover, the pawl control ring 510 is assembled on the left side of the angle control member 550 when viewed in the figures, so that the pawl control ring 510 is rotated in accordance with rotation of the angle control member 550 so as to enable the first and second control pawls 501 and 502 to be selectively erected or laid down.

The grooves 513 and 514 are formed on the inner peripheral surface of the pawl control ring 510, so that as the pawl control ring 510 is rotated, the first and second control pawls 501 and 502 sequentially come out from the pawl seating portions 101, respectively, to enable each of the control pawls 501 and 502 to be erected.

That is, the control pawls 501 and 502 are controlled depending on the rotation angle of the pawl control ring 510 to selectively restrict the rotation of the sun gears 411*a* and 411*b*, thereby performing shifting.

Also the aforementioned forced shifting function can prevent a phenomenon that if the first or second control pawl 501 or 502 is strongly engaged with one of the ratchets formed on the inner peripheral surface of the sun gear 411*a* or 411*b* in a loaded driving state, the first and second control pawls 501 and 502 are not laid down into the pawl seating portions 101 of the shaft 100 so that shifting is not smoothly achieved.

The controlled states of the first and second control pawls 501 and 502 depending on the control angle of the pawl control ring 510 described above are shown in detail in FIG. 5.

Hereinafter, operations of the embodiment that employs the planetary gear set 410 including the two-stage planetary gears 412 in the hub-embedded transmission provided with the shifting manipulation-assisting device of the present invention will be described below with respect to direct coupling, a first acceleration stage, and a second acceleration stage with reference to the accompanying drawings.

<Direct Coupling>

The direct coupling is an initial state where the shift lever is not manipulated, in other words, a state where all the control pawls 501 and 502 are laid down in the pawl seating portions 101 of the shaft 100 as shown in FIG. 5 (*a*). Thus all the sun gears 411*a* and 411*b* are not restrained.

In this state, when a driving force is transmitted through the sprocket 210, the driver 200 is rotated integrally with the sprocket 210.

At this time, the elastic pawls 220 provided on the driver 200 are engaged with the second teeth 413*b* formed on the inner peripheral surface of the ring gear 413 so that the rotational force of the driver 200 is transmitted to the ring gear 413 without shifting and then the rotational force transmitted to the ring gear 413 is output through the hub shell 300.

In this case, since the sun gears 411*a* and 411*b* can be freely rotated in the planetary gear set 410, upshifting is not performed and the sun gears are rotated idly.

In summary, in the direct coupling state, no one of the control pawls 501 and 502 restrains the sun gears 411*a* and 411*b*, and thus, the rotational force is transmitted through the sprocket 210→the driver 200→the elastic pawls 220→the ring gear 413→the hub shell 300, so that the rotational force is output without shifting.

<First Acceleration Stage>

The first acceleration stage is a state where the pawl control ring 510 is rotated in the counterclockwise direction by a certain angle in response to manipulation of the shift lever, in other words, a state where the first control pawl 501 is erected to restrain the first sun gear 411*a*, but the second control pawl 502 remains laying-down in the pawl seating portion 101 so that the second sun gear 411*b* is not restrained, as shown in FIG. 5 (*b*).

In this state, when a driving force is transmitted through the sprocket 210, the driver 200 is rotated.

At this time, rotation of the first sun gear 411*a* is restrained in the planetary gear set 410, so that the larger-diameter portions 412*a* of the planetary gears 412 are engaged with the first sun gear 411*a* so as to be accelerated to and rotated at a high speed. The accelerated rotational force of the planetary gears 412 is transmitted to the ring gear 413 through the first teeth 413*a* engaged with the planetary gears 412, and then the rotational force transmitted to the ring gear 413 is output through the hub shell 300.

In this case, the elastic pawls 220 provided on the driver 200 do not transmit the rotational force to the ring gear 413 because the rotation speed of the ring gear 413 is higher than the rotation speed of the driver 300.

In summary, in the first acceleration stage, only the first control pawl 501 restrains the first sun gear 411*a*, and thus, the rotational force is transmitted through the sprocket 210→the driver 200→the larger-diameter portions 412*a* of the planetary gears 412→the first teeth 413*a* of the ring gear 413→the hub shell 300, so that the rotational force is output in the accelerated state due to the shifting.

<Second Acceleration Stage>

The second acceleration stage is a state where the pawl control ring 510 is further rotated in the counterclockwise direction by a certain angle in response to manipulation of the shift lever as shown in FIG. 5 (*c*), in other words, a state where all the control pawls 501 and 502 are erected to restrain all the first sun gears 411*a* and 411*b*.

In this state, when the driving force is transmitted through the sprocket 210, the driver 200 is rotated.

At this time, rotation of the second sun gear 411*b* is restrained in the planetary gear set 410, so that the smaller-diameter portions 412*b* of the planetary gears 412 are engaged with the second sun gear 411*b* so as to be accelerated to and rotated at a higher speed. The accelerated rotational force of the planetary gears 412 is transmitted to the ring gear 413 through the first teeth 413*a* engaged with the planetary gears 412, and then the rotational force transmitted to the ring gear 413 is output through the hub shell 300.

Even in this case, the elastic pawls 220 provided on the driver 200 do not transmit the rotational force to the ring gear 413 because the rotation speed of the ring gear 413 is higher than the rotation speed of the driver 300.

In summary, in the second acceleration stage, all the control pawls 501 and 502 restrain all the sun gears 411*a* and 411*b*, and thus, the rotational force is transmitted through the sprocket 210→the driver 200→the smaller-diameter portions 412*b* and the larger-diameter portions 412*a* of the planetary gears 412→the first teeth 413*a* of the ring gear 413→the hub shell 300, so that the rotational force is output in the further accelerated state due to the shifting.

When deceleration is performed, control can be made in the reversed order of the aforementioned order, and the forced shifting function can be smoothly performed by the shifting manipulation-assisting device as described above even in the loaded driving state.

Therefore, the shifting manipulation-assisting device of the present invention and the hub-embedded transmission having the same have advantages in that in the transmission equipped with the planetary gear set 410, shifting control can be smoothly performed, and at the same time, a pressured frictional force can be arbitrarily adjusted to properly perform forced shifting, so that damage to components is prevented to improve durability and a large shifting shock is prevented to enhance user's convenience and driving stability and to maximize marketability and market competitiveness of the transmission.

The embodiment is merely an example for more specifically describing the technical spirit of the present invention, and the scope of the present invention is not limited to the embodiment or figures.

The invention claimed is:

1. A shifting manipulation-assisting device comprising:

a pawl control ring (510) having an inner peripheral surface configured to control laying-down of control pawls (501, 502) provided on a shaft (100) depending on a rotation angle, and an outer peripheral surface formed with rotation restricting protrusions (511) and unidirectionally inclined recesses (512);

an angle control member (520) configured to be positioned on an inner periphery side of a driver (200) rotated by receiving a rotational force and supported on the shaft (100), the angle control member (520) being rotated in response to shifting manipulation and having an outer periphery formed with rotation restricting depressions (521) for accommodating the rotation restricting protrusions (511) with a free-rotation gap in a circumferential direction;

pressing members (530) formed in a spherical or cylindrical shape, supported on the angle control member (520) so as to be movable in a radial direction, and positioned between the unidirectionally inclined recesses (512) of the pawl control ring (510) and an inner peripheral surface of the driver (200);

an elastic connecting body (540) connected between the pawl control ring (510) and the angle control member (520) to resiliently support the pawl control ring (510) such that the pawl control ring (510) is rotated with respect to the angle control member (520);

a fixed support member (580) non-rotatably fixed to the shaft (100) and rotatably supporting the driver (200) via a bearing (604); and a return spring (570) connected between the angle control member (520) and the fixed support member (580) to resiliently and reversely rotate and accordingly return the angle control member (520) that has been rotated in one direction in response to the shifting manipulation, wherein as a phase angle difference is generated in the circumferential direction between the angle control member (520) and the pawl control ring (510), the pressing members (530) ride on and outwardly move along the unidirectionally inclined recesses (512) and come into pressured frictional contact with the inner peripheral surface of the driver (200), so that a rotational force of the driver (200) can be selectively transmitted to the pawl control ring (510) depending on magnitude of a pressured frictional force generated between the driver (200) and the pressing members (530) so as to adjust forced laying-down of the control pawls (501, 502).

2. The shifting manipulation-assisting device according to claim 1, wherein:

the smaller an inclination angle of the unidirectionally inclined recesses (512) with respect to the outer peripheral surface of the pawl control ring (510) is or the greater an elastic modulus of the return spring (570) is, the higher the pressured frictional force generated between the driver (200) and the pressing members (530) can be, and the larger the inclination angle of the unidirectionally inclined recesses (512) with respect to the outer peripheral surface of the pawl control ring (510) is or the smaller the elastic modulus of the return spring (570) is, the lower the pressured frictional force generated between the driver (200) and the pressing members (530) can be.

3. The shifting manipulation-assisting device according to claim 2, wherein the inclination angle of the unidirectionally inclined recesses (512) with respect to the outer peripheral surface of the pawl control ring (510) is 12° to 20°.

4. A hub-embedded transmission having a shifting manipulation-assisting device, comprising:

a shaft (100) fixed to a vehicle body;

a driver (200) and a hub shell (300) rotatably positioned on around of the shaft (100), the driver (200) receiving a rotational force and the hub shell (300) outputting the rotational force;

a shifting unit (400) comprising a planetary gear set (410) provided in the hub shell (300), the planetary gear set (410) comprising sun gears, planetary gears (412) and a ring gear (413), the driver (200) rotatably supporting the planetary gears (412) so as to serve as a carrier, the driver (200) being provided with elastic pawls (220) resiliently supported to protrude outwardly, and an inner peripheral surface of the ring gear (430) being further formed with first teeth (413*a*) to be engaged with the planetary gears (412) and second teeth (413*b*) to be engaged with the elastic pawls (220), whereby the shifting unit (400) shifts a rotational force received from the driver and outputs a shifted rotational force to the hub shell (300); and a control unit (500) comprising the shifting manipulation-assisting device according to claim 1 and configured to control control pawls (501, 502) positioned in pawl seating portions (101) formed on the outer peripheral surface of the shaft (100) while the control unit (500) is rotated in a circumferential direction in response to manipulation of a shift lever, so as to selectively restrain rotation of the sun gears, thereby controlling shifting of the shifting unit (400).

5. The hub-embedded transmission having the shifting manipulation-assisting device according to claim 4, wherein:

the control unit (500) comprises:

a cable connecting member (550) rotatably supported on the outer peripheral surface of the shaft (100), a cable to be pulled in response to the manipulation of the shift lever being connected to the cable connecting member (550); and an intermediate connecting member (560) engaged with an inner peripheral surface of the cable connecting member (550) and rotated integrally with the cable connecting member (550), and the angle control member (520) passes through the fixed support member (580) without rotational interference and is assembled to an inner peripheral surface of the intermediate connecting member (560) so as to transmit the rotational force in one direction.

6. The hub-embedded transmission having the shifting manipulation-assisting device according to claim 5, wherein the planetary gears (412) are comprised with one-stage planetary gears or multi-stage planetary gears having two or more stages, and the control pawls and the sun gears are further configured depending on the number of stages of the planetary gear (412) so as to enable shifting to be performed with the number of shifting stages that is "(the number of stages of the planetary gear)+1".

* * * * *